(12) United States Patent
Chordia et al.

(10) Patent No.: US 9,459,768 B2
(45) Date of Patent: Oct. 4, 2016

(54) AUDIOVISUAL CAPTURE AND SHARING FRAMEWORK WITH COORDINATED USER-SELECTABLE AUDIO AND VIDEO EFFECTS FILTERS

(71) Applicant: Smule, Inc., Palo Alto, CA (US)

(72) Inventors: Parag P. Chordia, Los Altos Hills, CA (US); Perry R. Cook, Jacksonville, OR (US); Mark T. Godfrey, Atlanta, GA (US); Prerna Gupta, Los Altos Hills, CA (US); Nicholas M. Kruge, San Francisco, CA (US); Randal J. Leistikow, Palo Alto, CA (US); Alexander M. D. Rae, Atlanta, GA (US); Ian S. Simon, San Francisco, CA (US)

(73) Assignee: Smule, Inc., San Francisco, CA (US)

( * ) Notice: Subject to any disclaimer, the term of this patent is extended or adjusted under 35 U.S.C. 154(b) by 288 days.

(21) Appl. No.: 14/104,618

(22) Filed: Dec. 12, 2013

(65) Prior Publication Data

US 2014/0229831 A1    Aug. 14, 2014

Related U.S. Application Data

(63) Continuation-in-part of application No. 13/853,759, filed on Mar. 29, 2013, now Pat. No. 9,324,330.

(60) Provisional application No. 61/736,503, filed on Dec. 12, 2012.

(51) Int. Cl.
*G10L 21/04* (2013.01)
*G10L 21/055* (2013.01)
(Continued)

(52) U.S. Cl.
CPC ......... *G06F 3/0482* (2013.01); *G06F 3/04842* (2013.01); *G10L 21/003* (2013.01); *G10L 21/013* (2013.01); *G10L 21/055* (2013.01); *H04N 21/41407* (2013.01); *H04N 21/854* (2013.01)

(58) Field of Classification Search
CPC . G10L 21/0356; G10L 21/04; G10L 21/055; G10L 21/06; G10L 25/57; G10H 1/02; G10H 1/0025; H04N 21/854

USPC ......... 704/276, 278, 503, 504; 84/626, 634, 84/662, 667, 701, 712
See application file for complete search history.

(56) References Cited

U.S. PATENT DOCUMENTS 7,676,142 B1 * 3/2010 Hung ................... G11B 27/005
348/446
7,737,354 B2 * 6/2010 Basu ....................... G10H 7/008
84/609

(Continued)

FOREIGN PATENT DOCUMENTS

CN          101399036 A     4/2009
EP            1689155 A1     8/2006

OTHER PUBLICATIONS

Oytun Turk et al.; "Application of Voice Conversion for Cross-Language Rap Singing Transformation", Acoutics, Speech and Signal Processing Conference Proceedings, 2009, ICASSP 2009, IEEE International Conference, IEEE, Piscataway, NJ, USA, Apr. 19, 2009, pp. 3597-3600.

(Continued)

*Primary Examiner* — Martin Lerner
(74) *Attorney, Agent, or Firm* — Haynes and Boone, LLP

(57) ABSTRACT

Coordinated audio and video filter pairs are applied to enhance artistic and emotional content of audiovisual performances. Such filter pairs, when applied in audio and video processing pipelines of an audiovisual application hosted on a portable computing device (such as a mobile phone or media player, a computing pad or tablet, a game controller or a personal digital assistant or book reader) can allow user selection of effects that enhance both audio and video coordinated therewith. Coordinated audio and video are captured, filtered and rendered at the portable computing device using camera and microphone interfaces, using digital signal processing software executable on a processor and using storage, speaker and display devices of, or interoperable with, the device. By providing audiovisual capture and personalization on an intimate handheld device, social interactions and postings of a type made popular by modern social networking platforms can now be extended to audiovisual content.

48 Claims, 14 Drawing Sheets

(51) Int. Cl.
*H04N 21/854* (2011.01)
*G06F 3/0482* (2013.01)
*G06F 3/0484* (2013.01)
*G10L 21/003* (2013.01)
*G10L 21/013* (2013.01)
*H04N 21/414* (2011.01)

(56) References Cited

U.S. PATENT DOCUMENTS

| | | | | |
|---|---|---|---|---|
| 7,863,511 | B2* | 1/2011 | McNally | G10H 1/0025 |
| | | | | 84/609 |
| 7,985,917 | B2* | 7/2011 | Morris | G10H 1/0025 |
| | | | | 84/610 |
| 9,324,330 | B2* | 4/2016 | Chordia | G10L 19/00 |
| 2003/0144833 | A1* | 7/2003 | Glatt | G10L 19/167 |
| | | | | 704/200.1 |
| 2008/0089525 | A1 | 4/2008 | Kauko | |
| 2008/0165388 | A1* | 7/2008 | Serlet | G11B 27/034 |
| | | | | 358/448 |
| 2009/0198581 | A1* | 8/2009 | Lidestri | G06Q 30/0212 |
| | | | | 705/14.14 |
| 2010/0085379 | A1 | 4/2010 | Hishikawa et al. | |
| 2010/0111490 | A1* | 5/2010 | Nakamura | G11B 27/11 |
| | | | | 386/285 |
| 2010/0232765 | A1* | 9/2010 | Suginohara | G06F 17/30743 |
| | | | | 386/239 |
| 2011/0230232 | A1* | 9/2011 | Tran | G11B 27/034 |
| | | | | 455/556.1 |
| 2012/0251080 | A1* | 10/2012 | Svendsen | H04N 5/76 |
| | | | | 386/278 |
| 2015/0120308 | A1* | 4/2015 | Leistikow | G10H 1/366 |
| | | | | 704/500 |

OTHER PUBLICATIONS

M. Slaney et al.; "Automatic Audio Morphing", 1996 IEEE International Conference on Acoutics, Speech, and Signal Processing Conference Proceedings, vol. 2, Jan. 1, 1996, pp. 1001-1004.
Takeshi Saitou et al, "Speech-to-Singing Synthesis: Converting Speaking Voices to Singing Voices by Controlling Acoustic Features Unique to Singing Voices", IEEE, Oct. 21-24, 2007, pp. 215-218.
PCT International Search Report issued in PCT/US2013/034678 on Aug. 30, 2013, 5 pages.

* cited by examiner

AUDIOVISUAL CAPTURE AND SHARING FRAMEWORK WITH COORDINATED USER-SELECTABLE AUDIO AND VIDEO EFFECTS FILTERS

CROSS-REFERENCE TO RELATED APPLICATIONS

The present application claims priority of U.S. Provisional Application No. 61/736,503, filed Dec. 12, 2012, and is a continuation-in-part of U.S. application Ser. No. 13/853,759, filed Mar. 29, 2013. Each of the foregoing applications is incorporated herein by reference.

BACKGROUND

1. Field of the Invention

The present invention relates generally to computational techniques including digital signal processing for audiovisual content and, in particular, to techniques whereby a system or device may be programmed to apply coordinated audio and visual effects filtering to captured and/or accessed audiovisual content.

2. Description of the Related Art

The installed base of mobile phones and other handheld computing devices grows in sheer number and computational power each day. Hyper-ubiquitous and deeply entrenched in the lifestyles of people around the world, they transcend nearly every cultural and economic barrier. Computationally, the mobile phones of today offer speed and storage capabilities comparable to desktop computers from less than ten years ago, rendering them surprisingly suitable for real-time sound synthesis and other digital signal processing based transformations of audiovisual signals.

Indeed, modern mobile phones and handheld computing devices, including iOS™ devices such as the iPhone™, iPod Touch™ and iPad™ digital devices available from Apple Inc. as well as competitive devices that run the Android operating system, all tend to support audio and video playback and processing quite capably. These capabilities (including processor, memory and I/O facilities suitable for real-time digital signal processing, hardware and software CODECs, audiovisual APIs, etc.) have contributed to vibrant application and developer ecosystems. Examples in the music application space include the popular I Am T-Pain and Glee Karaoke social music apps available from Smule, Inc., which provide real-time continuous pitch correction of captured vocals, and the LaDiDa reverse karaoke app from Khush, Inc. which automatically composes music to accompany user vocals.

SUMMARY

It has been discovered that, in an application that manipulates audiovisual content, it is possible to apply coordinated audio and video filter pairs that enhance the artistic and emotional content of resulting audiovisual performances. Such filter pairs, when applied in audio and video processing pipelines of an audiovisual application hosted on a portable computing device (such as a mobile phone or media player, a computing pad or tablet, a game controller or a personal digital assistant or book reader) can allow a user to select effects that enhance both audio and the video coordinated therewith. Often, coordinated audio and video are captured, filtered and rendered at the portable computing device using camera and microphone interfaces thereof, using digital signal processing software executable on a processor thereof and using storage, speaker and display devices or, or interoperable with, the portable computing device. By providing audiovisual capture and personalization (e.g., through user selectable, but coordinated filter pairings) on an intimate handheld device such as mobile phone, social interactions and postings of a type made popular by modern social networking platforms can now be extended to audiovisual content.

By providing tightly-coupled audio and video filters, user interactions can be simplified and, at least in part due to the user's involvement in the creative process, social networking interactions enhanced. For example, in some embodiments of audiovisual applications described herein, a user may apply a coordinated pairing of audio and video effects filters to provide a vintage feel to captured audiovisual content. In the audio pipeline, the audio portion of the filter pairing may operate to band-limit captured (or retrieved) audio and add scratches and other noises evocative of a recording media of an earlier age. In the video pipeline, the video portion of the filter pairing may operate to skew a color map to sepia tones and add film grain texture and/or frame rate effects evocative of film projection. Other filter pairings may be selected to provide other styles or effects. For example, a holiday season filter pairing may operate (in the audio pipe) to mix with, or adapt captured vocals to, a seasonally appropriate audio track and to overlay simulated snowfall in the video pipe. Any of a variety of coordinated audio and video effects may be supported to enhance to the user and social networking experience. In some embodiments, a user may select and apply one filter pair (i.e., coordinated audio and video effects), then change his/her mind, selecting and applying any number of other filter pairings in audio and video processing pipelines hosted on his/her handheld device, before finalizing and posting with his/her captured audiovisual content processed in a pleasing or desired way. In some cases, premium audio and video effect pairings may be available for in-app purchase. In some cases, final rendering may be performed locally. In some cases, a remote platform separate from or integrated with a social networking service may perform the final rendering.

In some embodiments, music creation technologies are also employed and may affect, complement, or constitute part of the audio and video effect pairings. For example, in some cases, vocal-type audio input is used to drive music creation technology of a type that has been popularized in the LaDiDa application for iOS and Android devices (available from SMule) to create custom soundtracks based on the audio portion of the coordinated audiovisual content. Captured or retrieved audio input (which typically though need not necessarily include vocals) is processed and music is automatically (i.e., algorithmically) composed to match or complement the input.

In some cases, LaDiDa-type processing in the audio pipe may be specified by the audio portion of the coordinated audio and video effect pairing selected and applied by the user. In general, LaDiDa-type processing operates by pitch tracking the input and finding an appropriate harmonization. A resulting chord map is then used to generate the music, with different instruments used depending on a selected style. Input audio (e.g., user vocals voiced or sung) is, in turn, pitch corrected to match the key of the auto-generated accompaniment. In some cases, particular instrument selections for the auto-generated accompaniment, key or other style aspects may be specified by the audio filter portion of the coordinated pairing. In some cases, results of structural analysis of the input audio performed in the course of audio pipeline processing, such as to identify verse and chorus boundaries, may be propagated to the video pipeline to allow coordinated video effects.

Another form of music creation technology that may be employed in the audio pipeline to affect, complement, or constitute part of the audio and video effect pairings is audio processing of a type popularized in the Songify and AutoRap applications for iOS and Android devices (available from SMule). As before, captured or retrieved audio input (which typically includes vocals, though need not necessarily) are processed in the audio pipeline to create music. However, in the case of Songify and AutoRap technologies, the audio is adapted to an existing musical or rhythmic structure. In the case of Songify, audio input is segmented and remapped (as potentially reordered subphrases) to a phrase template of a target song. In the case of AutoRap, audio input is segmented, temporally aligned to a rhythmic skeleton of a target song. Selection of Songify or AutoRap processing may be specified by the audio portion of the coordinated audio and video effect pairing selected and applied by the user. As before, results of structural analysis of the input audio performed in the course of audio pipeline processing, such as to identify segmentation boundaries, remappings, alignments etc., may be propagated to the video pipeline to allow coordinated video effects.

An example of the process from a user perspective is illustrative. After the user captures, selects or creates a short video with an application executing on a portable computing device, he/she is presented with a set of filters, represented as selectable tiles or buttons. These selectable tiles or buttons are but one possible user interface presentation of the coordinated audio and video effect pairings discussed above. A frame of the recorded video is shown with a basic visual effect of that filter applied, making it easier for the user to choose an appropriate filter. When a user chooses a filter, he/she is, in the case of some at least some coordinated audio and video effect pairings, also choosing a particular music creation technology (LaDiDa-type, Songify or AutoRap, etc.), as well as a particular song or musical style. The output of music creation in the audio pipeline depends on the style/song chosen as well as the audio input.

Once the filter is chosen audio and video are rendered in accordance with the selected audio and video effect pairings, and the user may preview the result. Alternative audio and video effect pairings may be selected and previewed. Once the user is happy with a result provided by a particular audio and video effect filter pairing, he/she may approved it, and the audiovisual content is fully rendered. At this point, it is possible to add a comment or otherwise annotate posting of the audiovisual content to a remote server, to one or more social networking platforms and/or to eMail.

In some embodiments in accordance with the present invention, an audiovisual processing method includes use of a portable computing device to capture corresponding audio and video streams from microphone and camera interfaces thereof and to store, at least temporarily, the captured audio and video streams in storage. On the portable computing device, a first effect profile is selected from a plurality of predefined effect profiles. The predefined effect profiles are selective for respective and coordinated pairings of audio and visual filters to be applied to the audio and video streams, respectively. The audio and video streams are processed in respective and coordinated audio and video pipelines, wherein the coordination is based at least in part on application of the coordinated audio and visual filters to the respective audio and video streams. The audio and video streams are audiovisually rendered, with the coordinated audio and visual filters applied, to a display of the portable computing device. Thereafter, the rendered audiovisual content is stored, transmitted or posted.

In some embodiments, the method includes, prior to the storing, transmitting or posting, selecting at least a second effect profile from the plurality of predefined effect profiles and performing the processing and audiovisual rendering steps using the coordinated audio and visual filters of the second effect profile.

In some cases, the first effect profile is selective for an audio filter that, when applied in the audio pipeline, extracts temporally localizable features from the processed audio stream, and the coordination further includes using, in the video pipeline, at least one temporally localizable feature extracted in the audio pipeline. In some cases, the first effect profile is selective for a video filter that, when applied in the video pipeline, extracts temporally localizable features from the processed video stream, and the coordination further includes using, in the audio pipeline, at least one temporally localizable feature extracted in the video pipeline.

In some embodiments, the method includes segmenting, in the audio pipeline, the audio stream into plural segments and mapping individual ones of the segments to respective subphrase portions of a phrase template for a target song. The coordination further includes segmenting, in the video pipeline, the video stream and mapping segments thereof in correspondence with the audio segmentation and mapping. In some cases, the captured audio stream includes vocals temporally synchronized with the video stream, and the segments are delimited in the audio pipeline based on onsets detected in the vocals.

In some embodiments, the method includes segmenting, in the audio pipeline, the audio stream into plural segments, temporally aligning successive ones of the segments with respective pulses of a rhythmic skeleton for a target song, temporally stretching at least some of the temporally aligned segments and temporally compressing at least some other ones of the temporally aligned segments. The coordination further includes segmenting, in the video pipeline, the video stream and temporally aligning, stretching and compressing respective segments thereof in correspondence with the audio segmentation aligning, stretching and compressing. In some cases, the captured audio stream includes vocals temporally synchronized with the video stream, and the segments are delimited in the audio pipeline based on onsets detected in the vocals.

In some embodiments, the captured audio stream includes vocals and the method further includes automatically generating, in the audio pipeline, a musical accompaniment for the vocals based on a selection of chords that are harmonies of melody pitches detected in the vocals and further based on a statistical model of chord progressions.

In some embodiments, the method includes transacting from the portable computing device a purchase or license of one or more additional effects profiles. In some cases, the method further includes, in furtherance of the transacting, retrieving via a communications interface of the portable computing device, or unlocking a preexisting stored instance of, a computer readable encoding of the one or more additional effects profiles.

In some embodiments, the storage is local to the portable computing device. In some embodiments, the storage is at least partially network resident and remote from the portable computing device.

In some embodiments, the method further includes performing the processing in accord with at least a finally selected effect profile at a service platform that is in network communication with, but physically remote from, the portable computing device.

In some cases, an audio filter instance, when applied to the audio stream in the audio pipeline, provides one or more of spectral equalization, audio compression, pitch correction, stereo delay, reverberation or echo and mix with an audio track. In some cases, a video filter instance, when applied to the video stream in the video pipeline, provides one or more of blurring or sharpening, color map selection or transformation, chromatic distortion or equalization, visual noise, overlays or picture framing, brightness or contrast changes, and video frame rate changes or gating.

In some embodiments, the portable computing device is selected from the group of a computing pad, a game controller, a personal digital assistant or book reader, and a mobile phone or media player.

In some cases, the coordinated pairings of audio and visual filters specify artistically consistent effects to be applied to the audio and video streams. In some cases, at least one of the coordinated pairings of audio and visual filters specifies a vintage effect that, in the audio pipeline, includes a band-limiting filter and audio mix with a scratch and pop track and, in the video pipeline, includes a sepia tone filter and a video overlay with film grain and scratches.

In some embodiments in accordance with the present invention, a computer program product is encoded in one or more media. The computer program product includes instructions executable on a processor of the portable computing device to cause the portable computing device to perform at least a substantial subset of the steps recited in the foregoing method.

In some embodiments in accordance with the present invention, a system includes the portable computing device programmed with instructions executable on a processor thereof to cause the portable computing device to perform at least a substantial subset of the steps recited in the foregoing method.

In some embodiments in accordance with the present invention, a computational method for transforming audiovisual content includes accessing the encoding of audiovisual content from computer readable storage, wherein the audiovisual content includes coordinated audio and video streams; and processing the audio and video streams in respective and coordinated audio and video pipelines, wherein coordination of the respective audio and video pipelines includes using, in the processing by the video pipeline, temporally localizable features extracted in the audio pipeline.

In some cases, at least some of the temporally localizable features delimit audio-side epochs. In some cases, the coordination includes reordering respective portions of both the audio and video streams in accordance with the epochs. In some embodiments, the method further includes mapping audio of particular epochs to respective portions of a song template, wherein the mapping includes one or more of temporally stretching and compressing the audio. The coordination includes mapping the corresponding portions of the video stream in accord with the epoch mappings and applying a corresponding temporal stretch and compression to the video stream. In some cases, the mapping includes repeating respective portions of the audio stream, the coordinating includes applying a same repeat to the video stream. In some case, the audio stream includes vocals and at least some of the temporally localizable features correspond to onsets detected in the vocals.

In some embodiments, the method further includes segmenting, in the audio pipeline, an audio encoding of vocals into plural segments and mapping individual ones of the segments to respective subphrase portions of a phrase template for a target song. The coordination includes, in the video pipeline, segmenting the video stream and mapping segments thereof in correspondence with the audio segmentation and mapping. In some cases, the segments correspond to sequences of samples of the audio encoding delimited by onsets identified in the audio encoding. In some embodiments, the method further includes temporally aligning, in the audio pipeline, one or more of the mapped audio segments with a rhythmic skeleton for the target song, and in the video pipeline, temporally aligning the video segments in correspondence with the audio alignment.

In some embodiments, the method further includes segmenting, in the audio pipeline, an audio encoding of vocals into plural segments, temporally aligning successive ones of the segments with respective pulses of a rhythmic skeleton for a target song, temporally stretching at least some of the temporally aligned segments and temporally compressing at least some other ones of the temporally aligned segments. The coordination includes segmenting, in the video pipeline, the video stream and temporally aligning, stretching and compressing respective segments thereof in correspondence with the audio segmentation aligning, stretching and compressing.

In some embodiments, the captured audio stream includes vocals and the method further includes automatically generating, in the audio pipeline, a musical accompaniment for the vocals based on a selection of chords that are harmonies of melody pitches detected in the vocals and further based on a statistical model of chord progressions.

In some embodiments, the method further includes, on a portable computing device, capturing the coordinated audio and video streams and performing the audio and video stream processing in the respective and coordinated audio and video pipelines. In some embodiments, the method further includes, on the portable computing device, audiovisually rendering an output of the coordinated audio and video pipelines.

In some cases, the computer readable storage is local to a portable computing device that hosts the audio and video pipelines. In some cases, he computer readable storage is at least partially network resident and remote from a portable computing device that hosts the audio and video pipelines.

In some cases, the coordination of the respective audio and video pipelines further includes applying artistically consistent effects to the audio and video streams, and the method further includes audiovisually rendering the audio and video streams with the artistically consistent effects applied. In some cases, the artistically consistent effects include a vintage effect. The vintage effect applied in the audio pipeline includes a band-limiting filter and audio mix with a scratch and pop track, and the vintage effect applied in the video pipeline includes a sepia tone filter and a video overlay with film grain and scratches.

In some embodiments in accordance with the present invention, a computational method for transforming audiovisual content includes accessing the encoding of audiovisual content from computer readable storage, wherein the audiovisual content includes coordinated audio and video streams; and processing the audio and video streams in respective and coordinated audio and video pipelines, wherein coordination of the respective audio and video pipelines includes using, in the processing by the audio pipeline, temporally localizable features extracted in the video pipeline.

In some case, at least some of the temporally localizable features delimit video epochs, and the use of temporally localizable features includes segmenting the audio stream based at least in part on boundaries between the video epochs.

In some cases, the temporally localizable features include one or more of: a rapid change in magnitude or direction of optical flow; a rapid change in chromatic distribution; and a rapid change in overall or spatial distribution of brightness.

In some embodiments in accordance with the present invention, a method includes capturing coordinated audio and video streams at a portable computing device; processing the audio and video streams in respective and coordinated audio and video pipelines, wherein coordination of the respective audio and video pipelines includes either or both of (i) using one or more features extracted in the audio pipeline in the processing by the video pipeline and (ii) using one or more features extracted in the video pipeline in the processing by the audio pipeline; and on the portable computing device, audiovisually rendering output of the coordinated audio and video pipelines. In some cases, the portable computing device is selected from the group of: a computing pad; a game controller; a personal digital assistant or book reader; and a mobile phone or media player.

In some embodiments in accordance with the present invention, a computer program product encoded in one or more media includes instructions executable on a processor of the portable computing device to cause the portable computing device to perform the foregoing method.

In some embodiments in accordance with the present invention, a method includes (i) capturing coordinated audio and video streams using a portable computing device, the captured audio stream including vocals; (ii) selecting from amongst predefined pairs of coordinated audio and visual effects to be applied in audio and video pipelines of the portable computing device; (iii) automatically generating musical accompaniment for the vocals based on a selection of chords that are harmonies of melody pitches detected in the vocals and further based on a statistical model of chord progressions; and (iv) audiovisually rendering the audio and video streams with the coordinated audio and visual effects applied.

In some cases, the audiovisual rendering includes the automatically generated musical accompaniment. In some embodiments, the method further includes selecting at least a second predefined pair of coordinated audio and visual effects and thereafter audiovisually re-rendering the audio and video streams with the second pair of coordinated audio and visual effects applied. In some embodiments, the method further includes storing, transmitting or posting the rendered or re-rendered audiovisual content.

In some cases, the audio effects include one or more of: a reverb or echo effect; a chorus or harmonize effect; a band-limited filter evocative of telephone, citizens' band (CB) radio or vintage audio; and an overlay track. In some cases, the video effects include one or more of: a chromatic shift; a brightness or contrast change; a sharpening or blurring; and a video gating or overlay. In some cases, the portable computing device is selected from the group of: a computing pad; a game controller; a personal digital assistant or book reader; and a mobile phone or media player.

These and other embodiments, together with numerous variations thereon, will be appreciated by persons of ordinary skill in the art based on the description, claims and drawings that follow.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
FIG. 1 is screen shot image of a programmed handheld computing platform (illustratively a handheld device available from Apple, Inc.) executing software to capture audio-visual content and apply user selected instances of coordinated audio and video filter pairings in accordance with some embodiments of the present invention(s).

As described herein, automated transformations of captured user vocals may provide captivating applications executable even on the handheld computing platforms that have become ubiquitous since the advent of iOS and Android-based phones, media devices and tablets. The automatic transformations may even be implemented in purpose-built devices, such as for the toy, gaming or amusement device markets.

In an application that manipulates audiovisual content such as described herein, it is possible to apply coordinated audio and video filter pairs that enhance the artistic and emotional content of resulting audiovisual performances. Such filter pairs, when applied in audio and video processing pipelines of an audiovisual application hosted on a portable computing device (such as a mobile phone or media player, a computing pad or tablet, a game controller or a personal digital assistant or book reader) can allow a user to select effects that enhance both audio and the video coordinated therewith. Often, coordinated audio and video are captured, filtered and rendered at the portable computing device using camera and microphone interfaces thereof, using digital signal processing software executable on a processor thereof and using storage, speaker and display devices or, or interoperable with, the portable computing device. By providing audiovisual capture and personalization (e.g., through user selectable, but coordinated filter pairings) on an intimate handheld device such as mobile phone, social interactions and postings of a type made popular by modern social networking platforms can now be extended to audiovisual content.

By providing tightly-coupled audio and video filters, user interactions can be simplified and, at least in part due to the user's involvement in the creative process, social networking interactions enhanced. For example, in some embodiments of audiovisual applications described herein, a user may apply a coordinated pairing of audio and video effects filters to provide a vintage feel to captured audiovisual content. In the audio pipeline, the audio portion of the filter pairing may operate to band-limit captured (or retrieved) audio and add scratches and other noises evocative of a recording media of an earlier age. In the video pipeline, the video portion of the filter pairing may operate to skew a color map to sepia tones and add film grain texture and/or frame rate effects evocative of film projection. Other filter pairings may be selected to provide other styles or effects. For example, a holiday season filter pairing may operate (in the audio pipe) to mix with, or adapt captured vocals to, a seasonally appropriate audio track and to overlay simulated snowfall in the video pipe. Any of a variety of coordinated audio and video effects may be supported to enhance to the user and social networking experience. In some embodiments, a user may select and apply one filter pair (i.e., coordinated audio and video effects), then change his/her mind, selecting and applying any number of other filter pairings in audio and video processing pipelines hosted on his/her handheld device, before finalizing and posting with his/her captured audiovisual content processed in a pleasing or desired way. In some cases, premium audio and video effect pairings may be available for in-app purchase. In some cases, final rendering may be performed locally. In some cases, a remote platform separate from or integrated with a social networking service may perform the final rendering.

In some embodiments, music creation technologies are also employed and may affect, complement, or constitute part of the audio and video effect pairings. For example, in some cases, vocal-type audio input is used to drive music creation technology of a type that has been popularized in the LaDiDa application for iOS and Android devices (available from SMule) to create custom soundtracks based on the audio portion of the coordinated audiovisual content. Captured or retrieved audio input (which typically though need not necessarily include vocals) is processed and music is automatically (i.e., algorithmically) composed to match or complement the input.

In some cases, LaDiDa-type processing in the audio pipe may be specified by the audio portion of the coordinated audio and video effect pairing selected and applied by the user. In general, LaDiDa-type processing operates by pitch tracking the input and finding an appropriate harmonization. A resulting chord map is then used to generate the music, with different instruments used depending on a selected style. Input audio (e.g., user vocals voiced or sung) is, in turn, pitch corrected to match the key of the auto-generated accompaniment. In some cases, particular instrument selections for the auto-generated accompaniment, key or other style aspects may be specified by the audio filter portion of the coordinated pairing. In some cases, results of structural analysis of the input audio performed in the course of audio pipeline processing, such as to identify verse and chorus boundaries, may be propagated to the video pipeline to allow coordinated video effects.

Another form of music creation technology that may be employed in the audio pipeline to affect, complement, or constitute part of the audio and video effect pairings is audio processing of a type popularized in the Songify and AutoRap applications for iOS and Android devices (available from SMule). As before, captured or retrieved audio input (which typically includes vocals, though need not necessarily) are processed in the audio pipeline to create music. However, in the case of Songify and AutoRap technologies, the audio is adapted to an existing musical or rhythmic structure. In the case of Songify, audio input is segmented and remapped (as potentially reordered subphrases) to a phrase template of a target song. In the case of AutoRap, audio input is segmented, temporally aligned to a rhythmic skeleton of a target song. Selection of Songify or AutoRap processing may be specified by the audio portion of the coordinated audio and video effect pairing selected and applied by the user. As before, results of structural analysis of the input audio performed in the course of audio pipeline processing, such as to identify segmentation boundaries, remappings, alignments etc., may be propagated to the video pipeline to allow coordinated video effects.

An example of the process from a user perspective is illustrative. After the user captures, selects or creates a short video with an application executing on a portable computing device, he/she is presented with a set of filters, represented as selectable tiles or buttons. These selectable tiles or buttons are but one possible user interface presentation of the coordinated audio and video effect pairings discussed above. A frame of the recorded video is shown with a basic visual effect of that filter applied, making it easier for the user to choose an appropriate filter. When a user chooses a filter, he/she is, in the case of some at least some coordinated audio and video effect pairings, also choosing a particular music creation technology (LaDiDa-type, Songify or AutoRap, etc.), as well as a particular song or musical style. The output of music creation in the audio pipeline depends on the style/song chosen as well as the audio input.

Once the filter is chosen audio and video are rendered in accordance with the selected audio and video effect pairings, and the user may preview the result. Alternative audio and video effect pairings may be selected and previewed. Once the user is happy with a result provided by a particular audio and video effect filter pairing, he/she may approved it, and the audiovisual content is fully rendered. At this point, it is possible to add a comment or otherwise annotate posting of the audiovisual content to a remote server, to one or more social networking platforms and/or to eMail.

Exemplary Implementation and Operational Flows

FIG. 1 is screen shot image of a programmed, portable computing device (illustratively, a handheld device 101 available from Apple, Inc.) executing software to capture audiovisual content and to apply user selected instances of coordinated audio and video filter pairings. Coordinated audio and video filter pairings are user selectable by way of a touchscreen user interface and are themselves selective for digital signal processing, including in some cases segmentation (audio or video), feature extraction and/or auto-accompaniment techniques, applied to captured content by the programmed, portable computing device.

FIGS. 2A, 2B, 2C and 2D are flowcharts illustrating operation of software suitable for execution on a portable computing device such as handheld device 101 and, in certain illustrated variations with and without use of music creation technologies, to capture audiovisual content and apply user selected instances of coordinated audio and video filter pairings and render audiovisual content. In some cases, such software is embodied as an application (e.g., CineBeat application 200) executable on the portable computing device. In each case, audio and video filter pairings are selective for respective computational manipulations of audio and video content to produce a coordinated effect.

As an example, though without limitation, an audio filter 221 instance, when applied to an audio stream 211 through audio pipeline 220, may provide one or more of spectral equalization, audio compression, pitch correction, stereo delay, reverberation or echo and mix with an audio track. Likewise, though again without limitation, a video filter 231 instance, when applied to the video stream 212 through video pipeline 230, may provide one or more of blurring or sharpening, color map selection or transformation, chromatic distortion or equalization, visual noise, overlays or picture framing, brightness or contrast changes, and video frame rate changes or gating.

In some cases, the coordinated pairings of audio and visual filters (221, 231) specify artistically consistent effects to be applied to audio and video streams (211, 212). For example, at least one of the coordinated pairings of audio (221) and video (231) filters may specify a vintage effect that, in the audio pipeline 220, includes a band-limiting filter and audio mix with a scratch and pop track and, in the video pipeline 230, includes a sepia tone filter and a video overlay with film grain and scratches. Other artistically consistent effects may be provided by way of coordinated pairings of audio and visual filters selected in accordance with a performance genre, seasonal theming, etc. Based on the description here, persons of ordinary skill in the art will appreciate a wide range of coordinated pairings of audio and video filters that may be appropriate or desirable, and provided in accord with the flows of FIGS. 2A, 2B, 2C and/or 2D, for a given application, situation or deployment.

In FIGS. 2A, 2B, 2C and 2D, certain common or analogous features, structures and operations are illustrated. Functional flows and interactions of CineBeat application 200 are illustrated in the context of certain structures and features of exemplary, portable computing device-type execution environment. For example, audio content is captured at (or from) a microphone device (or interface) 201 using A/D conversion 205 and other audio circuits or firmware/software provided on the portable computing device platform and supplied as digitally-encoded audio to audio pipeline 220. Likewise, video content is captured at (or from) a camera device (or interface) 202 using frame buffer 206 and other video circuits or firmware/software provided on the portable computing device platform and supplied as digitally-encoded video to video pipeline 230. In each case, storage 208 is provided and may be employed for temporary storage (and retrieval) of captured audio and video content to allow application of successive selections of coordinated audio and video filter pairings.

Selections of coordinated audio and video filter pairings are effectuated by a user using touchscreen display 203, although other user interfaces designs are contemplated and may be appropriate for particular applications, computing platforms or deployments. Audio and video content, as transformed and processed in audio and video pipelines (220, 230), are rendered in temporally coordinated form using rendering engine 250 to present to the user as a transformed and processed audiovisual performance via a speaker/audio interface 204 and display 203. Rendering engine 250 may also employ or provide audiovisual CODECs to appropriately encode the transformed and processed audiovisual performance in a manner suitable for transmission to, and/or storage at, content server 310. In some systems or deployments, content server 310 may serve such audiovisual content to other devices, to handheld device 101 itself, and/or to (or through) social networks. In some cases, content server 310 at least partially implements a cloud-based social music network. In some cases, premium filters, posted audiovisual content etc. may be supplied by (or unlocked based on information supplied from) content server 310.

Note that, in general, coordinated audio/video effect filter pairings may be implemented in any of a variety of ways and using any of a variety of different coding techniques. In some cases, audio and video effect filters are defined at least in part using digital filter coefficients, lookup tables and data (e.g., retrieved from storage 208 or elsewhere) that inform operation of the respective audio and video pipelines. In some cases, audio and video effect filters may be defined, at least in part, using functional code (e.g., retrieved from storage 208 or elsewhere) called from the respective pipelines to execute in conjunction with the respective pipelines and thereby operate on digital representations of the audio and video content therein.

Figure 2A:
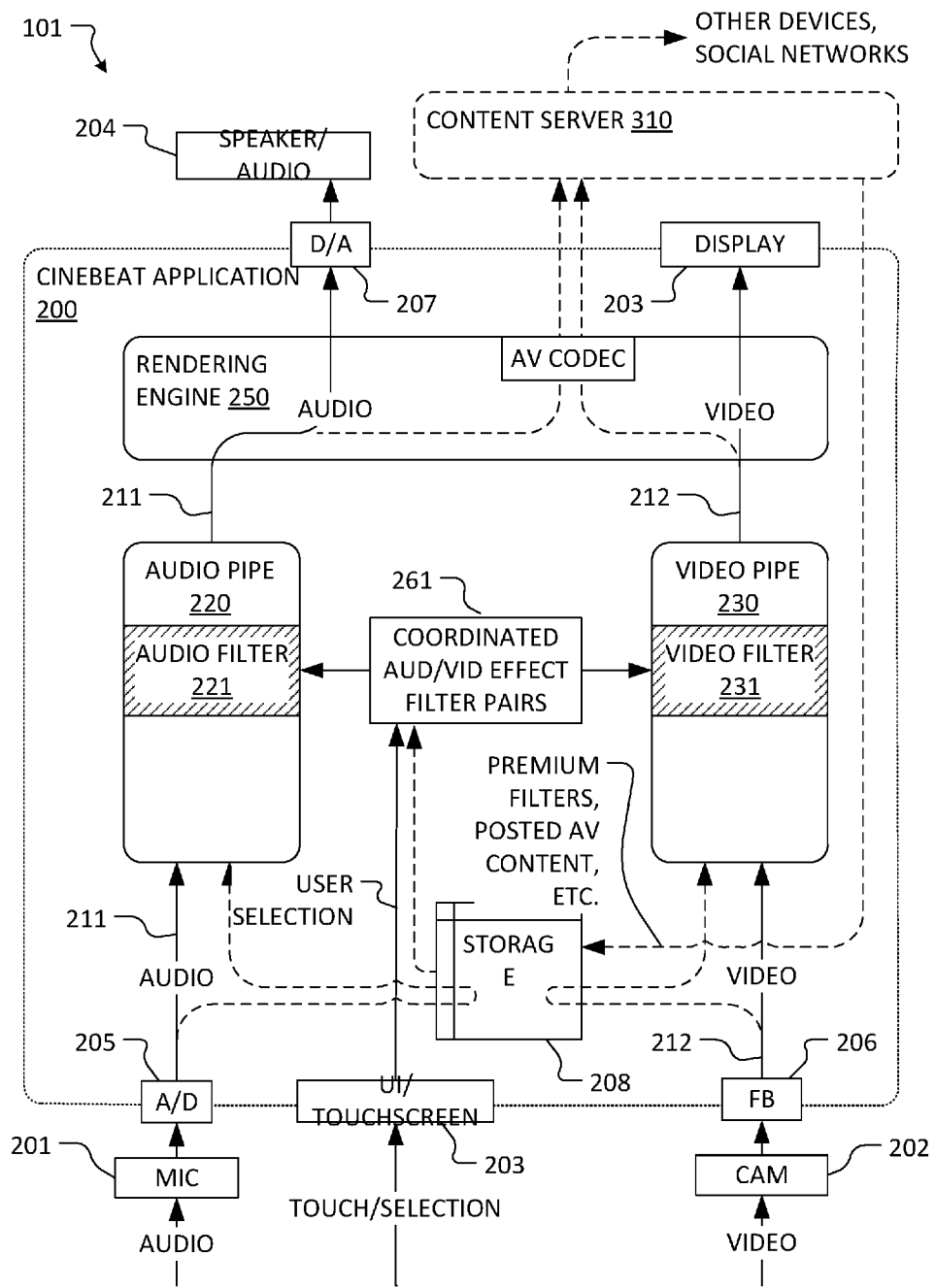
FIGS. 2A, 2B, 2C and 2D are flowcharts illustrating operation of software suitable for execution on a portable computing device and, in certain illustrated variations with and without use of music creation technologies, to capture audiovisual content and apply user selected instances of coordinated audio and video filter pairings and render audiovisual content in accordance with some embodiments of the present invention(s).
Figure 2B:
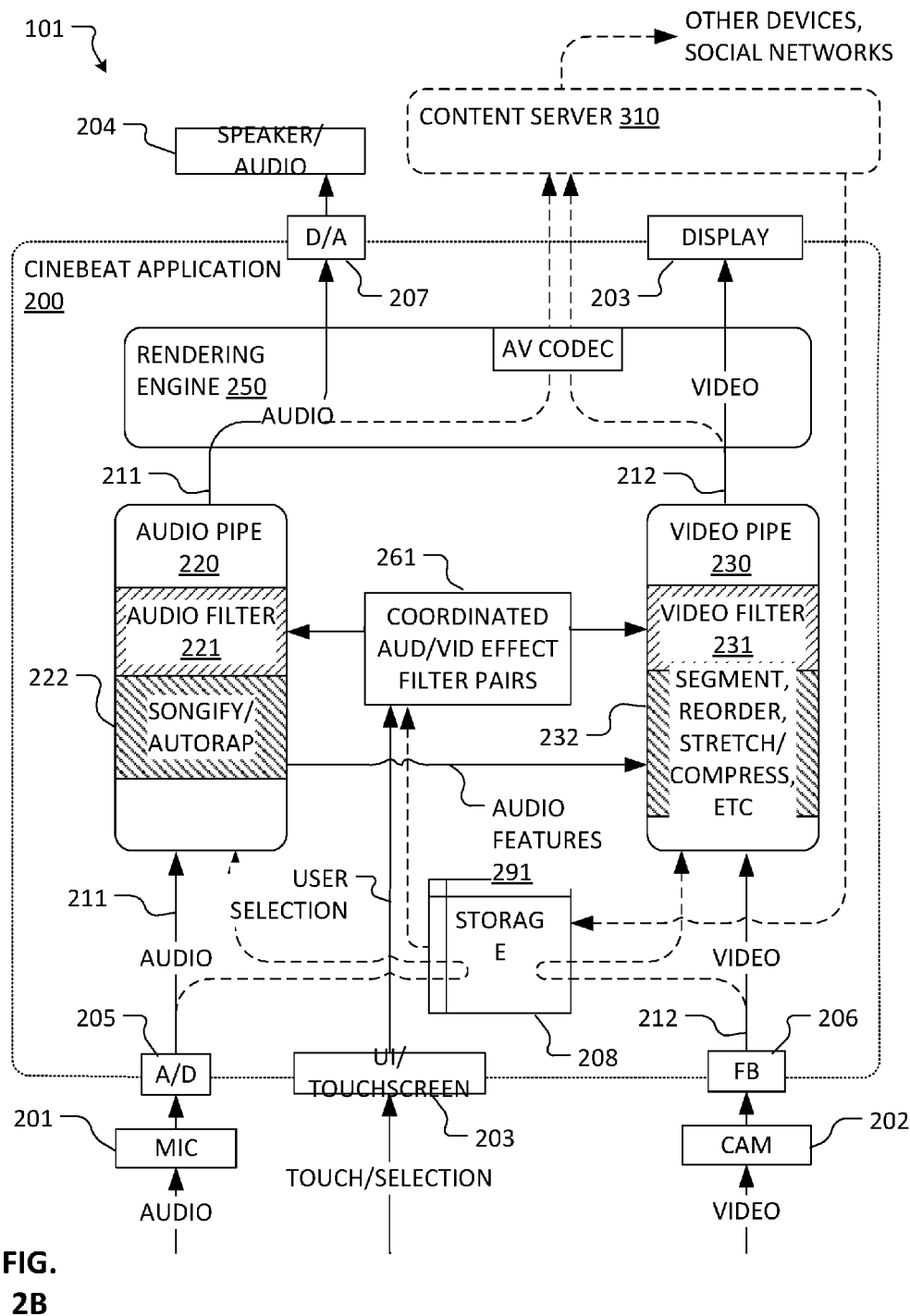

Turning now to FIG. 2B, a variation on the FIG. 2A functional flows is illustrated and described. Specifically, the FIG. 2B variation adds speech to music transformations (Songify/AutoRap functionality 222) into audio pipeline 220. Implementations of Songify/AutoRap functionality 222 and transformations performed thereby are more completely described below. However, in the flow of FIG. 2B, Songify/AutoRap functionality 222 will be understood as additional signal processing performed on captured audio to prepare derived audio that has, or conforms to, certain musical structural characteristics or templates, be they phrase structure, meter, tonal values, etc.

Particulars are described below, but a notable aspect illustrated in FIG. 2B is that audio features 291 that are computed in the context of Songify/AutoRap functionality 222 (e.g., indications of segmentation, reordering in accord with phrase structure, stretch or compression segments or blocks, spectral characteristics, tonal value, rhythm or meter, loudness, performance embellishments, etc.) are conveyed to video pipeline 230 to facilitate corresponding and coordinated transformations 232 to the video content. In this way, Songify/AutoRap-type reorderings of portions of audio content are in corresponding reorderings of corresponding video content. Likewise, for portions of the audio content that are temporally stretched or compressed by Songify/AutoRap functionality 222, corresponding portions of the video content are likewise stretched or compressed, e.g., by variation in frame rate or effective frame rate. Other examples of audio features computed in audio pipeline 220 that may be conveyed to video pipeline 230 and thereby affect (in a coordinated manner) video content eventually displayed at display 203 will be understood in the context of this description and examples that follow.

Figure 2C:
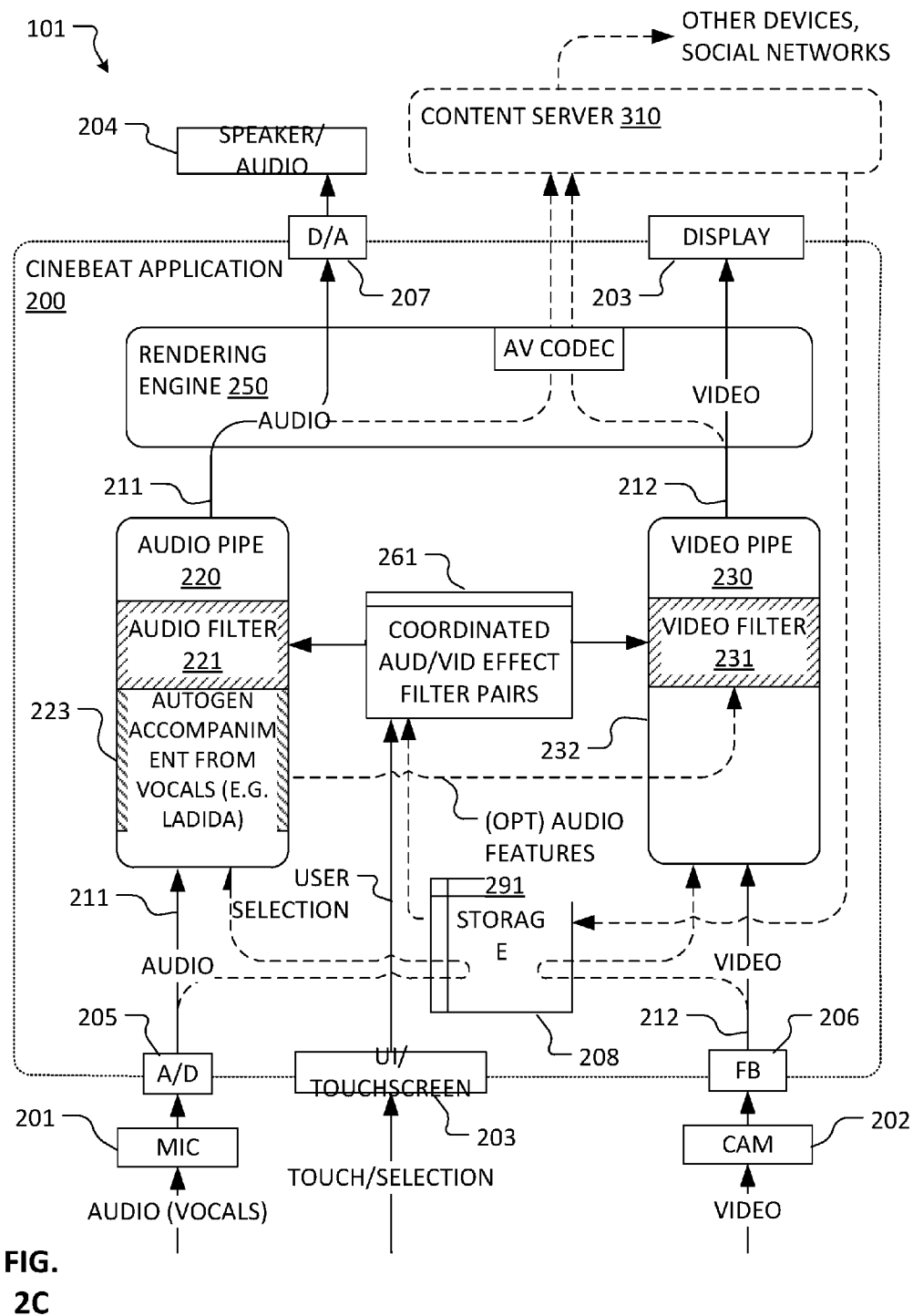

FIG. 2C depicts another variation, in which captured audio includes vocals, and in which computationally automated generation of musical accompaniment from captured vocals is provided in addition to the basic functionality (recall FIG. 2A) of coordinated audio and video effects filter pairings 261 applied in audio (220) and video (230) pipelines. Details of the LaDiDa-type auto-generation of accompaniment functionality 222 are provided below; however, in the flow of FIG. 2C, LaDiDa-type functionality 223 will be understood as additional signal processing performed on captured vocal audio to track vocal pitch and estimate key, analyze melody structure and identify boundaries and sections, and based on such derived characteristics to automatically generate musical accompaniment. Optionally, audio features extracted by LaDiDa-type functionality 223 (e.g., structure boundaries) and/or selections (e.g., style) computationally derived therefrom may be propagated to the video pipeline 230 side video filter 231 so as to coordinate application of video performance effects with audio content (vocals with autogenerated accompaniment) processed in audio pipeline 220.

Figure 2D:
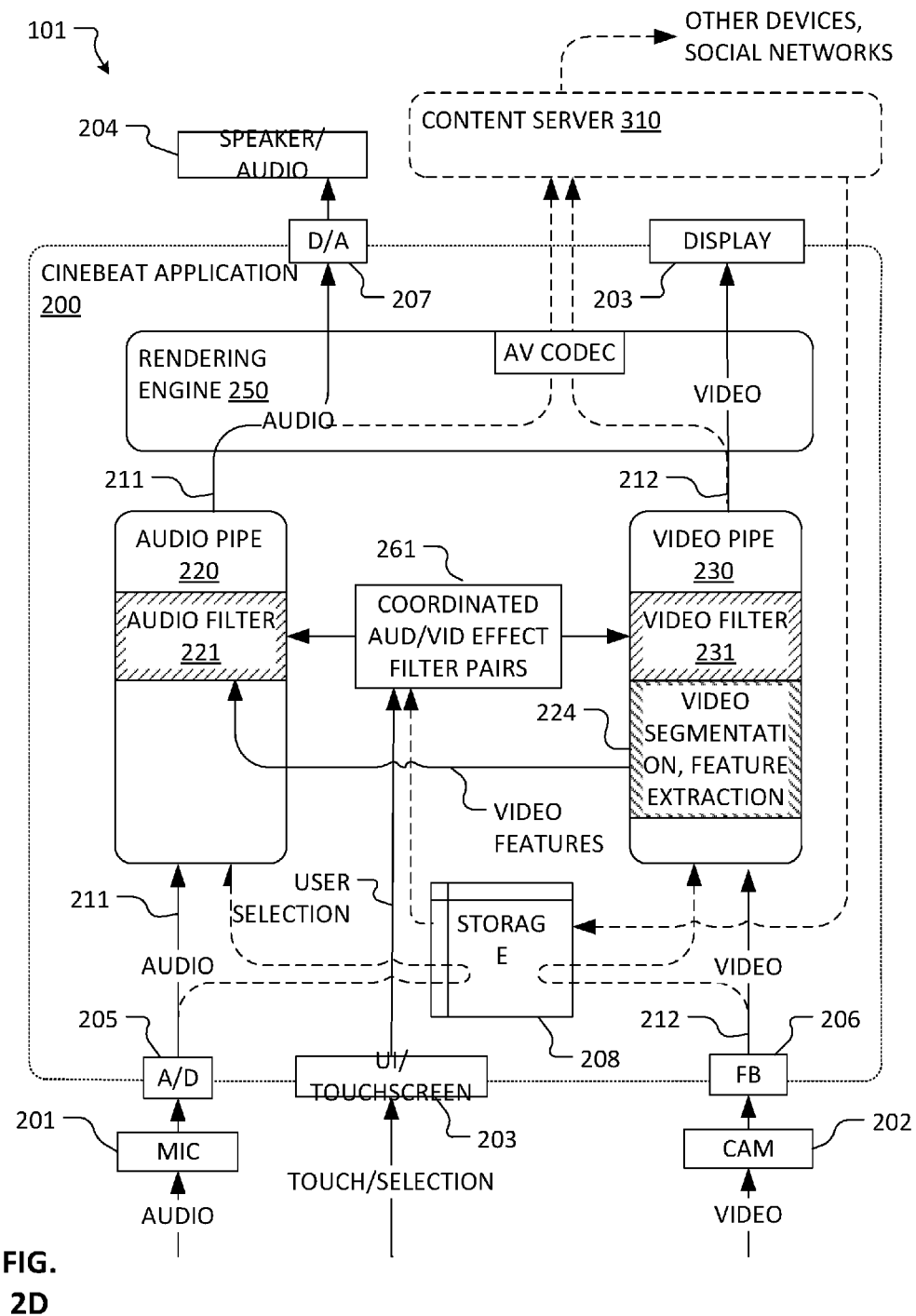

FIG. 2D depicts still another variation, in which it is segmentation of, and/or feature extraction from, captured video content that drives audio pipeline 220 side audio filter 221 so as to coordinate application of audio performance effects with video content processed in video pipeline 230. Although FIGS. 2A, 2B, 2C and 2D are illustrated and described as separate functional flows, persons of skill in the art having benefit of the present disclosure will appreciate that, in some cases or embodiments, aspects of one or more of the functional flows may be incorporated in a combined form.

Music Creation Technologies, Generally

As described hereinabove (recall e.g., FIGS. 2B and 2C) and elsewhere herein, some embodiments in accordance with the present inventions may employ music creation technologies in addition to the more traditional audio and video effects. As with the more traditional audio and video effects, selections of particular music creation facilities and settings may be effectuated as part of a framework that provides tightly coupled audio and video filters as coordinated pairings.

Implementations of the music creation technologies are based on advanced digital signal processing techniques and allow handheld device implementations in which mere novice user-musicians may capture, process, render and share audiovisual performances. In some cases, the automated transformations can be used to generate custom soundtracks based on the audio portion of coordinated audiovisual content. Captured or retrieved audio input (often vocals) is processed and music is automatically (i.e., algorithmically) composed to match or complement the input. An operative implementation of these automatic accompaniment techniques is described below.

Likewise, audio inputs (including sung or spoken vocals) may be segmented, arranged, temporally aligned with a target rhythm, meter or accompanying backing tracks and pitch corrected in accord with a score or note sequence. Speech-to-song music implementations are one such example and exemplary songification application is described below. In some cases, spoken vocals may be transformed in accord with musical genres such as rap using automated segmentation and temporal alignment techniques, often without pitch correction. Such applications, which may employ different signal processing and different automated transformations, may nonetheless be understood as speech-to-rap variations on the theme. Adaptations to provide an exemplary AutoRap application are also described herein.

In the interest of concreteness, processing and device capabilities, terminology, API frameworks and even form factors typical of a particular implementation environment, namely the iOS device space popularized by Apple, Inc. have been assumed. Notwithstanding descriptive reliance on any such examples or framework, persons of ordinary skill in the art having access to the present disclosure will appreciate deployments and suitable adaptations for other computing platforms and other concrete physical implementations.

Automated Speech to Music Transformation ("Songification")

Figure 3:
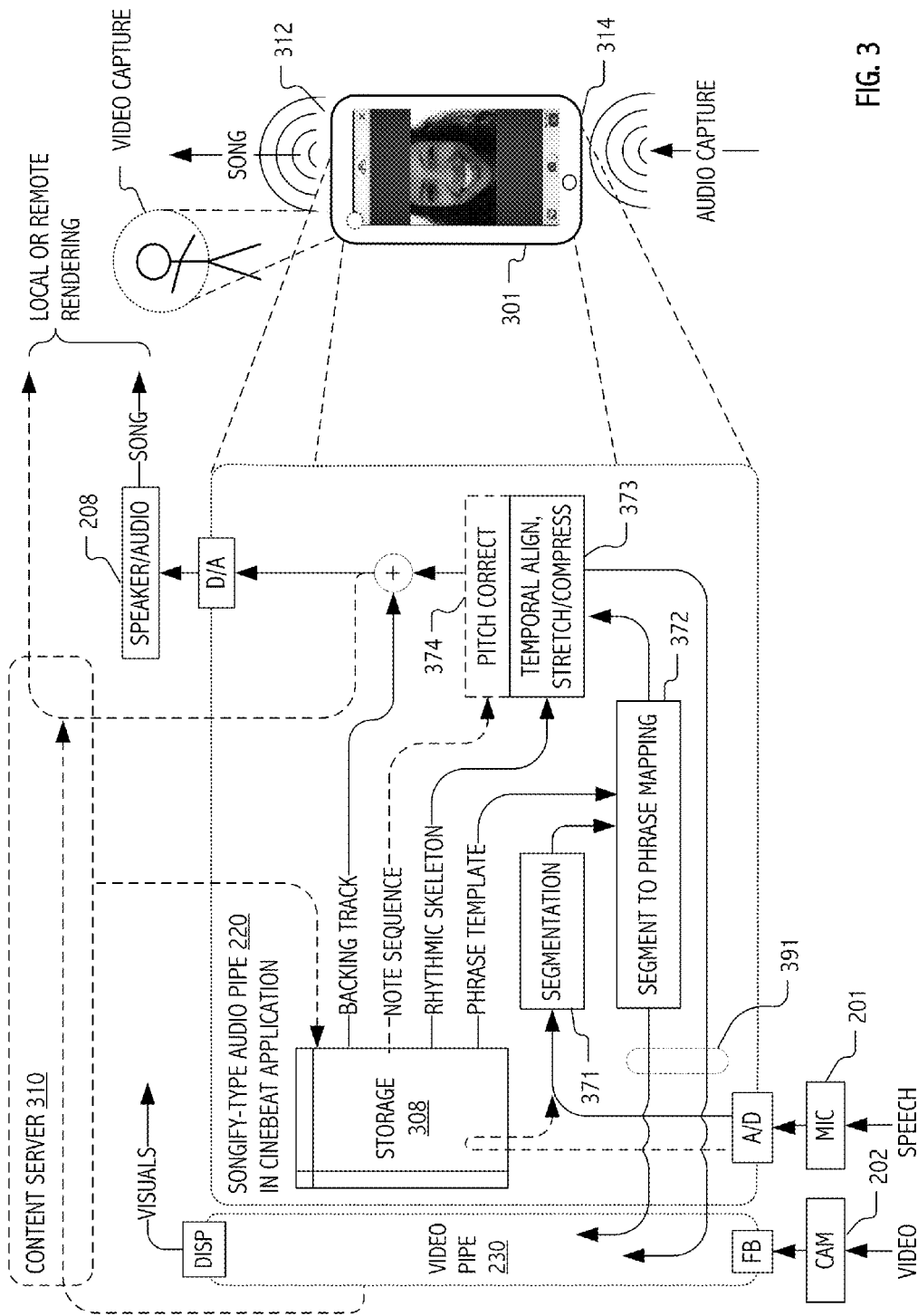
FIG. 3 is a functional block diagram illustrating data flows amongst functional blocks of in, or in connection with, an audio pipeline processing in an illustrative embodiment in which a particular class of music creation technologies is employed.

In FIG. 2B, an embodiment was described that adds speech to music transformations (Songify/AutoRap functionality 222) into audio pipeline 220. Implementations of Songify/AutoRap functionality 222 and transformations performed thereby are now more completely described. As before, Songify/AutoRap functionality 222 will be understood generally as additional signal processing performed on captured audio to prepare derived audio that has, or conforms to, certain musical structural characteristics or templates, be they phrase structure, meter, tonal values, etc. FIG. 3 illustrates, in somewhat greater detail, functional and signal/data flows employed in an embodiment that employs Songify-type speech to music transforms in audio pipe 220 to segment captured audio (here speech), to map segments to a phrase template and to temporally align, stretch and/or compress the (re)mapped audio for optional further audio processing, e.g., pitch correction, mixing with a backing track and application (not specifically shown, but recall FIG. 2B) of video filters.

Specifically, FIG. 3 is a functional block diagram illustrating data flows amongst functional blocks of, or in connection with, an illustrative iOS-type handheld 301 compute platform embodiment of the present invention(s) in which a Songify-type audio pipe 220 executes to automatically transform vocals captured using a microphone 314 (or similar interface) and is audibly rendered (e.g., via speaker 312 or coupled headphone). Data sets for particular musical targets (e.g., a backing track, phrase template, pre-computed rhythmic skeleton, optional score and/or note sequences) may be downloaded into local storage 308 (e.g., demand supplied or as part of a software distribution or update) from a remote content server 310 or other service platform.

Extracted or derived audio features 391 are conveyed to video pipe 230 to facilitate coordinated operations on video content. For example, audio features 391 may include segmentation boundaries (e.g., coded as temporal markers) and remapping information conveyed to video pipe 230 to allow it to decompose temporally aligned video content into corresponding snippets and temporally reorder and replicate such snippets in correspondence with segment-to-phrase-template mappings performed in audio pipe 220. Various illustrated functional blocks (e.g., audio signal segmentation 371, segment-to-phrase mapping 372, temporal alignment and stretch/compression 373 of segments, and pitch correction 374) will be understood, with reference to signal processing techniques detailed herein, to operate upon audio signal encodings derived from captured vocals and represented in memory or non-volatile storage on the compute platform.

Figure 4:
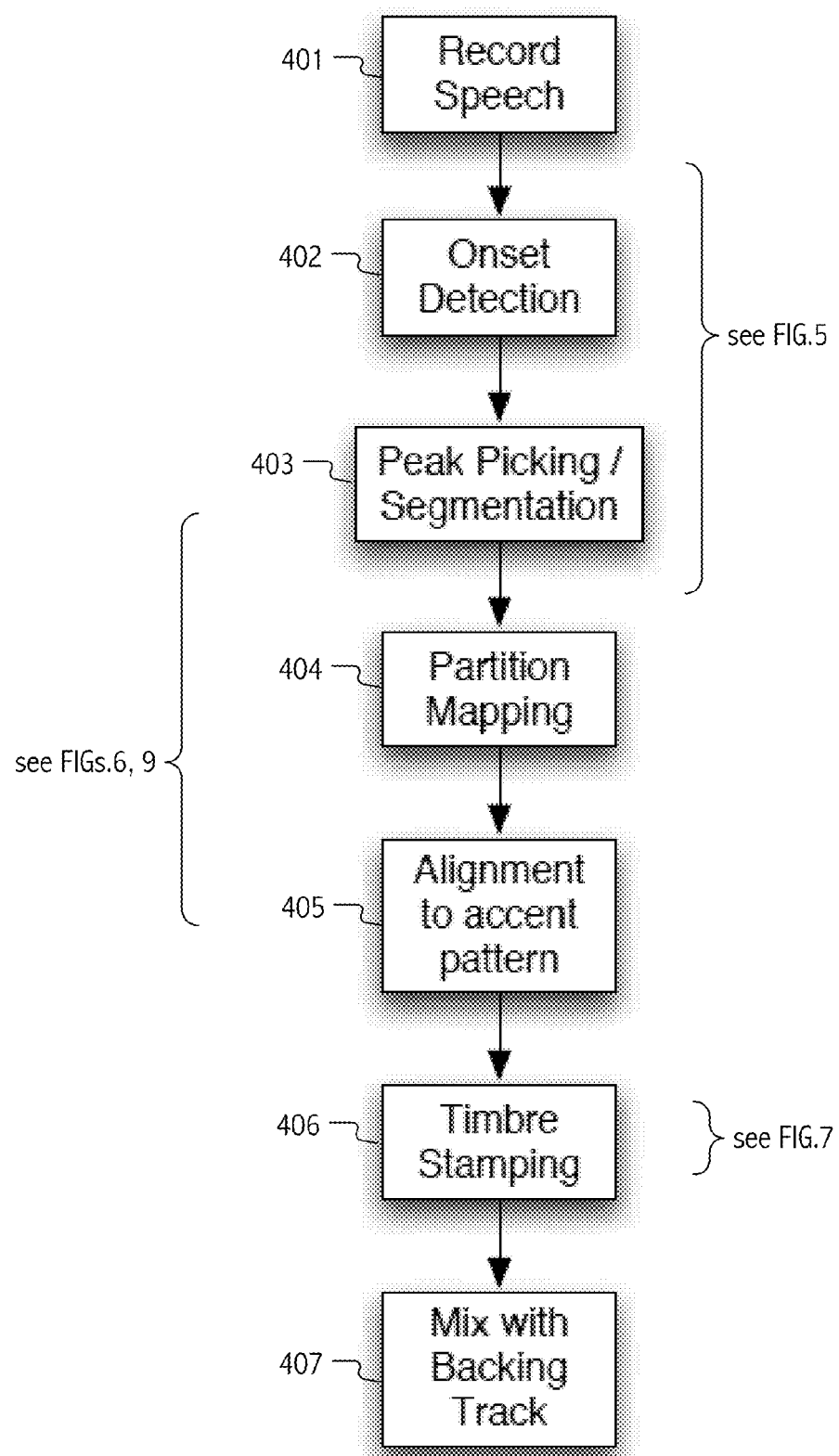
FIG. 4 is a flowchart illustrating a sequence of steps in an illustrative method whereby, in accordance with some embodiments of the present invention(s), a captured speech audio encoding is automatically transformed into an output song, rap or other expressive genre having meter or rhythm for audible rendering with a backing track.

FIG. 4 is a flowchart illustrating a sequence of steps (401, 402, 403, 404, 405, 406 and 407) in an illustrative method whereby a captured speech audio encoding (e.g., that captured from microphone 314, recall FIG. 3), is automatically transformed into an output song, rap or other expressive genre having meter or rhythm for audible rendering with a backing track. Specifically, FIG. 4 summarizes a flow (e.g., through functional or computational blocks such as illustrated relative to Songify application 220 executing on the illustrative iOS-type handheld 301 compute platform, recall FIG. 3) that includes:

- capture or recording (401) of speech as an audio signal;
- detection (402) of onsets or onset candidates in the captured audio signal;
- picking from amongst the onsets or onset candidates peaks or other maxima so as to generate segmentation (403) boundaries that delimit audio signal segments;
- mapping (404) individual segments or groups of segments to ordered sub-phrases of a phrase template or other skeletal structure of a target song (e.g., as candidate phrases determined as part of a partitioning computation);
- evaluating rhythmic alignment (405) of candidate phrases to a rhythmic skeleton or other accent pattern/structure for the target song and (as appropriate) stretching/compressing to align voice onsets with note onsets and (in some cases) to fill note durations based on a melody score of the target song;
- using a vocoder or other filter re-synthesis-type timbre stamping (406) technique by which captured vocals (now phrase-mapped and rhythmically aligned) are shaped by features (e.g., rhythm, meter, repeat/reprise organization) of the target song; and
- eventually mixing (407) the resultant temporally aligned, phrase-mapped and timbre stamped audio signal with a backing track for the target song.

These and other aspects are described in greater detail below and illustrated relative to FIGS. 5-8.

Speech Segmentation

When lyrics are set to a melody, it is often the case that certain phrases are repeated to reinforce musical structure. Our speech segmentation algorithm attempts to determine boundaries between words and phrases in the speech input so that phrases can be repeated or otherwise rearranged. Because words are typically not separated by silence, simple silence detection may, as a practical matter, be insufficient in many applications. Exemplary techniques for segmentation of the captured speech audio signal will be understood with reference to FIG. 5 and the description that follows.

Sone Representation

The speech utterance is typically digitized as speech encoding 501 using a sample rate of 44100 Hz. A power spectrum is computed from the spectrogram. For each frame, an FFT is taken using a Hann window of size 1024 (with a 50% overlap). This returns a matrix, with rows representing frequency bins and columns representing time-steps. In order to take into account human loudness perception, the power spectrum is transformed into a sone-based representation. In some implementations, an initial step of this process involves a set of critical-band filters, or bark band filters 511, which model the auditory filters present in the inner ear. The filter width and response varies with frequency, transforming the linear frequency scale to a logarithmic one. Additionally, the resulting sone representation 502 takes into account the filtering qualities of the outer ear as well as modeling spectral masking. At the end of this process, a new matrix is returned with rows corresponding to critical bands and columns to time-steps.

Onset Detection

One approach to segmentation involves finding onsets. New events, such as the striking of a note on a piano, lead to sudden increases in energy in various frequency bands. This can often be seen in the time-domain representation of the waveform as a local peak. A class of techniques for finding onsets involves computing (512) a spectral difference function (SDF). Given a spectrogram, the SDF is the first difference and is computed by summing the differences in amplitudes for each frequency bin at adjacent time-steps. For example:

$$SDF[i] = (\Sigma(B[i] - B[i-1])^{0.25})^4$$

Figure 5:
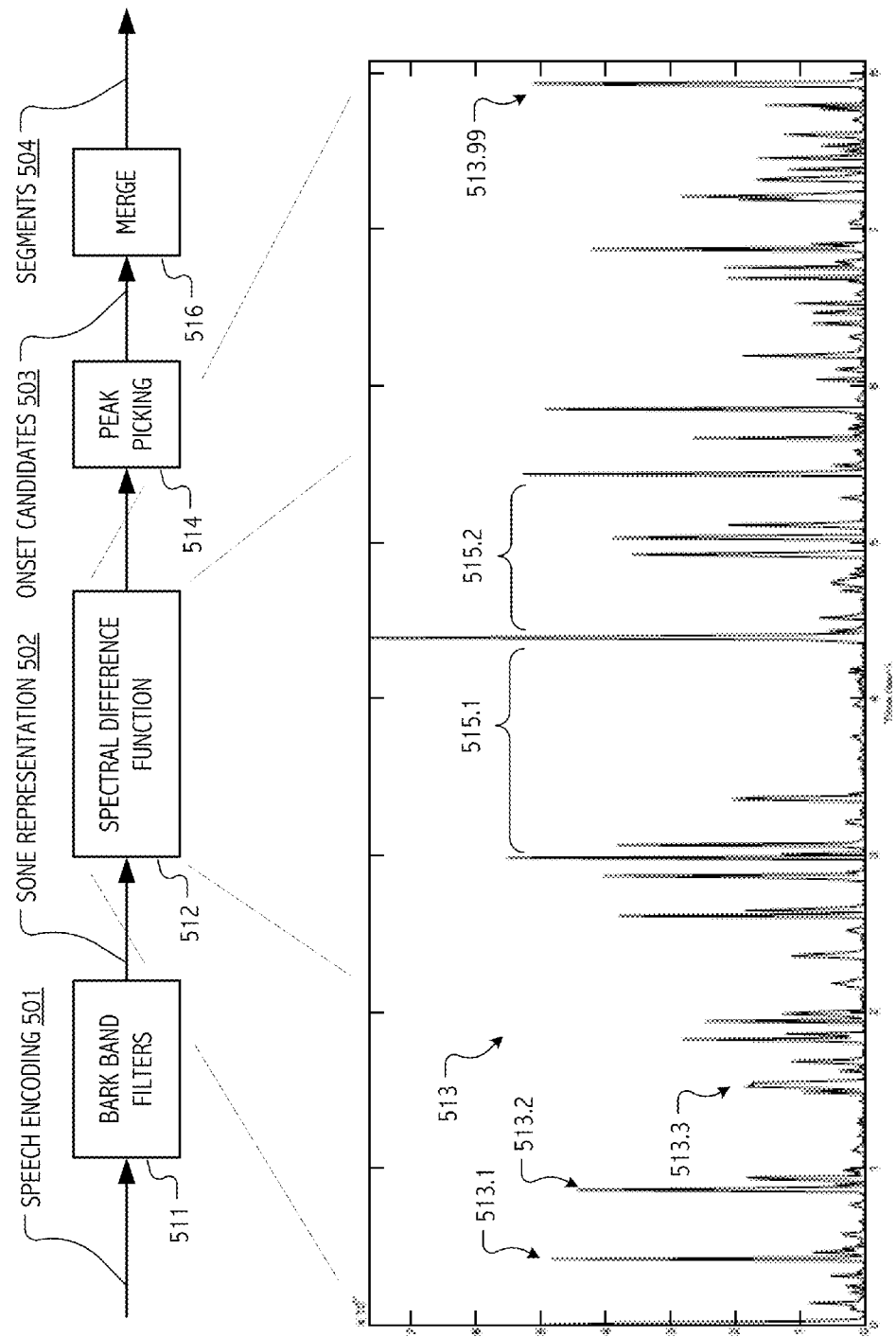
FIG. 5 illustrates, by way of a flowchart and a graphical illustration of peaks in a signal resulting from application of a spectral difference function, a sequence of steps in an illustrative method whereby an audio signal is segmented in accordance with some embodiments of the present invention(s).

Here we apply a similar procedure to the sone representation, yielding a type of SDF 513. The illustrated SDF 513 is a one-dimensional function, with peaks indicating likely onset candidates. FIG. 5 depicts an exemplary SDF computation 512 from an audio signal encoding derived from sampled vocals together with signal processing steps that precede and follow SDF computation 512 in an exemplary audio processing pipeline.

We next define onset candidates 503 to be the temporal location of local maxima (or peaks 513.1, 513.2, 513.3 . . . 513.99) that may be picked from the SDF (513). These locations indicate the possible times of the onsets. We additionally return a measure of onset strength that is determined by subtracting the level of the SDF curve at the local maximum from the median of the function over a small window centered at the maximum. Onsets that have an onset strength below a threshold value are typically discarded. Peak picking 514 produces a series of above-threshold-strength onset candidates 503.

We define a segment (e.g., segment 515.1) to be a chunk of audio between two adjacent onsets. In some cases, the onset detection algorithm described above can lead to many false positives leading to very small segments (e.g. much smaller than the duration of a typical word). To reduce the number of such segments, certain segments (see e.g., segment 515.2) are merged (516)) using an agglomeration algorithm. First, we determine whether there are segments that are shorter than a threshold value (here we start at 0.372 seconds threshold). If so, they are merged with a segment that temporally precedes or follows. In some cases, the direction of the merge is determined based on the strength of the neighboring onsets.

The result is segments that are based on strong onset candidates and agglomeration of short neighboring segments to produce the segments (504) that define a segmented version of the speech encoding (501) that are used in subsequent steps. In the case of speech-to-song embodiments (see FIG. 6), subsequent steps may include segment mapping to construct phrase candidates and rhythmic alignment of phrase candidates to a pattern or rhythmic skeleton for a target song. In the case of speech-to-rap embodiments (see FIG. 9), subsequent steps may include alignment of segment delimiting onsets to a grid or rhythmic skeleton for a target song and stretching/compressing of particular aligned segments to fill to corresponding portions of the grid or rhythmic skeleton.

Phrase Construction for Speech-to-Song Embodiments

Figure 6:
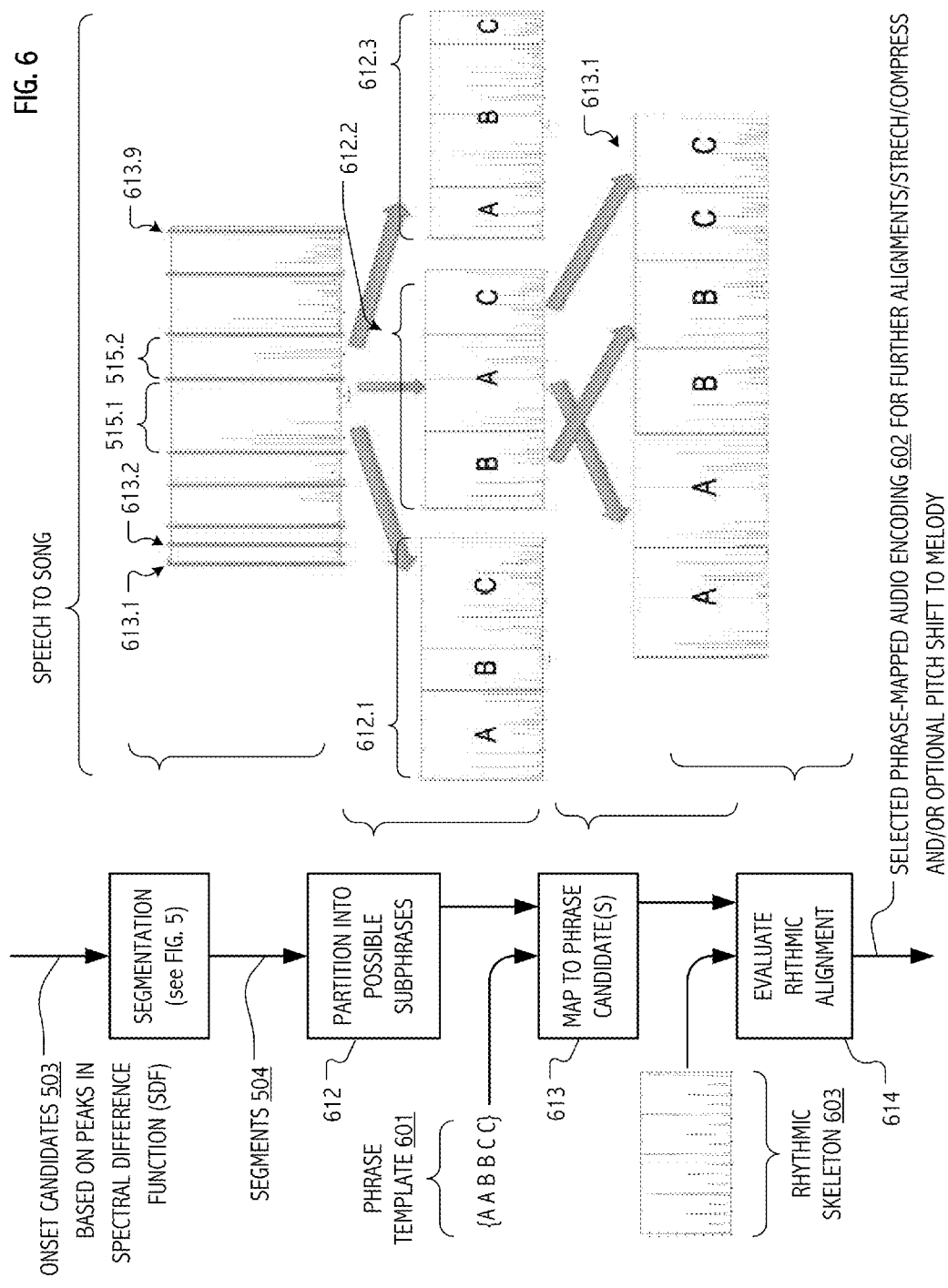
FIG. 6 illustrates, by way of a flowchart and a graphical illustration of partitions and subphrase mappings to a template, a sequence of steps in an illustrative method whereby a segmented audio signal is mapped to a phrase template and resulting phrase candidates are evaluated for rhythmic alignment therewith in accordance with some speech-to-song targeted embodiments of the present invention(s).

FIG. 6 illustrates, in further detail, phrase construction aspects of a larger computational flow (e.g., as summarized in FIG. 4 through functional or computational blocks such as previously illustrated and described relative to an application executing on a compute platform, recall FIG. 3). The illustration of FIG. 6 pertains to certain illustrative speech-to-song embodiments.

One goal of the previously described phrase construction step is to create phrases by combining segments (e.g., segments 504 such as may be generated in accord with techniques illustrated and described above relative to FIG. 5), possibly with repetitions, to form larger phrases. The process is guided by what we term phrase templates. A phrase template encodes a symbology that indicates the phrase structure, and follows a typical method for representing musical structure. For example, the phrase template {A A B B C C} indicates that the overall phrase consists of three sub-phrases, with each sub-phrase repeated twice. The goal of phrase construction algorithms described herein is to map segments to sub-phrases. After computing (612) one or more candidate sub-phrase partitionings of the captured speech audio signal based on onset candidates 503 and segments 504, possible sub-phrase partitionings (e.g., partitionings 612.1, 612.2 . . . 612.3) are mapped (613) to structure of phrase template 601 for the target song. Based on the mapping of sub-phrases (or indeed candidate sub-phrases) to a particular phrase template, a phrase candidate 613.1 is produced. FIG. 6 illustrates this process diagrammatically and in connection with subsequence of an illustrative process flow. In general, multiple phrase candidates may be prepared and evaluated to select a particular phrase-mapped audio encoding for further processing. In some embodiments, the quality of the resulting phrase mapping (or mappings) is (are) evaluated (614) based on the degree of rhythmic alignment with the underlying meter of the song (or other rhythmic target), as detailed elsewhere herein.

In some implementations of the techniques, it is useful to require the number of segments to be greater than the number of sub-phrases. Mapping of segments to sub-phrases can be framed as a partitioning problem. Let m be the number of sub-phrases in the target phrase. Then we require m−1 dividers in order to divide the vocal utterance into the correct number of phrases. In our process, we allow partitions only at onset locations. For example, in FIG. 6, we show a vocal utterance with detected onsets (613.1, 613.2 . . . 613.9) and evaluated in connection with target phrase structure encoded by phrase template 601 {A A B B C C}. Adjacent onsets are combined, as shown in FIG. 6, in order to generate the three sub-phrases A, B, and C. The set of all possible partitions with m parts and n onsets is $\binom{n}{m-1}$. One of the computed partitions, namely sub-phrase partitioning 613.2, forms the basis of a particular phrase candidate 613.1 selected based on phrase template 601.

Note that in some embodiments, a user may select and reselect from a library of phrase templates for differing target songs, performances, artists, styles etc. In some embodiments, phrase templates may be transacted, made available or demand supplied (or computed) in accordance with a part of an in-app-purchase revenue model or may be earned, published or exchanged as part of a gaming, teaching and/or social-type user interaction supported.

Because the number of possible phrases increases combinatorially with the number of segments, in some practical implementations, we restrict the total segments to a maximum of 20. Of course, more generally and for any given application, search space may be increased or decreased in accord with processing resources and storage available. If the number of segments is greater than this maximum after the first pass of the onset detection algorithm, the process is repeated using a higher minimum duration for agglomerating the segments. For example, if the original minimum segment length was 0.372 seconds, this might be increased to 0.5 seconds, leading to fewer segments. The process of increasing the minimum threshold will continue until the number of target segments is less than the desired amount. On the other hand, if the number of segments is less than the number of sub-phrases, then it will generally not be possible to map segments to sub-phrases without mapping the same segment to more than one sub-phrase. To remedy this, the onset detection algorithm is reevaluated in some embodiments using a lower segment length threshold, which typically results in fewer onsets agglomerated into a larger number of segments. Accordingly, in some embodiments, we continue to reduce the length threshold value until the number of segments exceeds the maximum number of sub-phrases present in any of the phrase templates. We have a minimum sub-phrase length we have to meet, and this is lowered if necessary to allow partitions with shorter segments.

Based on the description herein, persons of ordinary skill in the art will recognize numerous opportunities for feeding back information from later stages of a computational process to earlier stages. Descriptive focus herein on the forward direction of process flows is for ease and continuity of description and is not intended to be limiting.

Rhythmic Alignment

Each possible partition described above represents a candidate phrase for the currently considered phrase template. To summarize, we exclusively map one or more segments to a sub-phrase. The total phrase is then created by assembling the sub-phrases according to the phrase template. In the next stage, we wish to find the candidate phrase that can be most closely aligned to the rhythmic structure of the backing track. By this we mean we would like the phrase to sound as if it is on the beat. This can often be achieved by making sure accents in the speech tend to align with beats, or other metrically important positions.

To provide this rhythmic alignment, we introduce a rhythmic skeleton (RS) 603 as illustrated in FIG. 6, which gives the underlying accent pattern for a particular backing track. In some cases or embodiments, rhythmic skeleton 603 can include a set of unit impulses at the locations of the beats in the backing track. In general, such a rhythmic skeleton may be precomputed and downloaded for, or in conjunction with, a given backing track or computed on demand. If the tempo is known, it is generally straightforward to construct such an impulse train. However, in some tracks it may be desirable to add additional rhythmic information, such as the fact that the first and third beats of a measure are more accented than the second and fourth beats. This can be done by scaling the impulses so that their height represents the relative strength of each beat. In general, an arbitrarily complex rhythmic skeleton can be used. The impulse train, which consists of a series of equally spaced delta functions is then convolved with a small Hann (e.g. five-point) window to generate a continuous curve:

$$RS[n] = \sum_{m=0}^{N-1} \omega[n] * \delta[n-m], \text{ where } \omega(n) = 0.5\left(1 - \cos\frac{2\pi n}{N-1}\right)$$

We measure the degree of rhythmic alignment (RA), between the rhythmic skeleton and the phrase, by taking the cross correlation of the RS with the spectral difference function (SDF), calculated using the sone representation. Recall that the SDF represents sudden changes in signal that correspond to onsets. In the music information retrieval literature we refer to this continuous curve that underlies onset detection algorithms as a detection function. The detection function is an effective method for representing the accent or mid-level event structure of the audio signal. The cross correlation function measures the degree of correspondence for various lags, by performing a point-wise multiplication between the RS and the SDF and summing, assuming different starting positions within the SDF buffer. Thus for each lag the cross correlation returns a score. The peak of the cross correlation function indicates the lag with the greatest alignment. The height of the peak is taken as a score of this fit, and its location gives the lag in seconds.

The alignment score A is then given by $$\max A[n] = \max \sum_{m=0}^{N-1} RS[n-m] * SDF[m]$$

This process is repeated for all phrases and the phrase with the highest score is used. The lag is used to rotate the phrase so that it starts from that point. This is done in a circular manner. It is worth noting that the best fit can be found across phrases generated by all phrase templates or just a given phrase template. We choose to optimize across all phrase templates, giving a better rhythmic fit and naturally introducing variety to the phrase structure.

When a partition mapping requires a sub-phrase to repeat (as in a rhythmic pattern such as specified by the phrase template {A A B C}), the repeated sub-phrase was found to sound more rhythmic when the repetition was padded to occur on the next beat. Likewise, the entire resultant partitioned phrase is padded to the length of a measure before repeating with the backing track.

Accordingly, at the end of the phrase construction (613) and rhythmic alignment (614) procedure, we have a complete phrase constructed from segments of the original vocal utterance that has been aligned to the backing track. If the backing track or vocal input is changed, the process is re-run. This concludes the first part of an illustrative "songification" process. A second part, which we now describe, transforms the speech into a melody.

To further synchronize the onsets of the voice with the onsets of the notes in the desired melody line, we use a procedure to stretch voice segments to match the length of the melody. For each note in the melody, the segment onset (calculated by our segmentation procedure described above) that occurs nearest in time to the note onset while still within a given time window is mapped to this note onset. The notes are iterated through (typically exhaustively and typically in a generally random order to remove bias and to introduce variability in the stretching from run to run) until all notes with a possible matching segment are mapped. The note-to-segment map then is given to the sequencer which then stretches each segment the appropriate amount such that it fills the note to which it is mapped. Since each segment is mapped to a note that is nearby, the cumulative stretch factor over the entire utterance should be more or less unity, however if a global stretch amount is desired (e.g. slow down the result utterance by 2), this is achieved by mapping the segments to a sped-up version of the melody: the output stretch amounts are then scaled to match the original speed of the melody, resulting in an overall tendency to stretch by the inverse of the speed factor.

Although the alignment and note-to-segment stretching processes synchronize the onsets of the voice with the notes of the melody, the musical structure of the backing track can be further emphasized by stretching the syllables to fill the length of the notes. To achieve this without losing intelligibility, we use dynamic time stretching to stretch the vowel sounds in the speech, while leaving the consonants as they are. Since consonant sounds are usually characterized by their high frequency content, we used spectral roll-off up to 95% of the total energy as the distinguishing feature between vowels and consonants. Spectral roll-off is defined as follows. If we let $|X[k]|$ be the magnitude of the k-th Fourier coefficient, then the roll-off for a threshold of 95% is defined to be $k\_roll = \Sigma_{k=0}^{k\_roll}X[k] < 0.95 * \Sigma_{k=0}^{N-1}|X[k]|$, where N is the length of the FFT. In general, a greater k_roll Fourier bin index is consistent with increased high-frequency energy and is an indication of noise or an unvoiced consonant. Likewise, a lower k_roll Fourier bin index tends to indicate a voiced sound (e.g., a vowel) suitable for time stretching or compression.

The spectral roll-off of the voice segments are calculated for each analysis frame of 1024 samples and 50% overlap. Along with this the melodic density of the associated melody (MIDI symbols) is calculated over a moving window, normalized across the entire melody and then interpolated to give a smooth curve. The dot product of the spectral roll-off and the normalized melodic density provides a matrix, which is then treated as the input to the standard dynamic programming problem of finding the path through the matrix with the minimum associated cost. Each step in the matrix is associated with a corresponding cost that can be tweaked to adjust the path taken through the matrix. This procedure yields the amount of stretching required for each frame in the segment to fill the corresponding notes in the melody.

Speech to Melody Transform

Although fundamental frequency, or pitch, of speech varies continuously, it is does not generally sound like a musical melody. The variations are typically too small, too rapid, or too infrequent to sound like a musical melody. Pitch variations occur for a variety of reasons including the mechanics of voice production, the emotional state of the speaker, to indicate phrase endings or questions, and an inherent part of tone languages.

In some embodiments, the audio encoding of speech segments (aligned/stretched/compressed to a rhythmic skeleton or grid as described above) is pitch corrected in accord with a note sequence or melody score. As before, the note sequence or melody score may be precomputed and downloaded for, or in connection with, a backing track.

Figure 7:
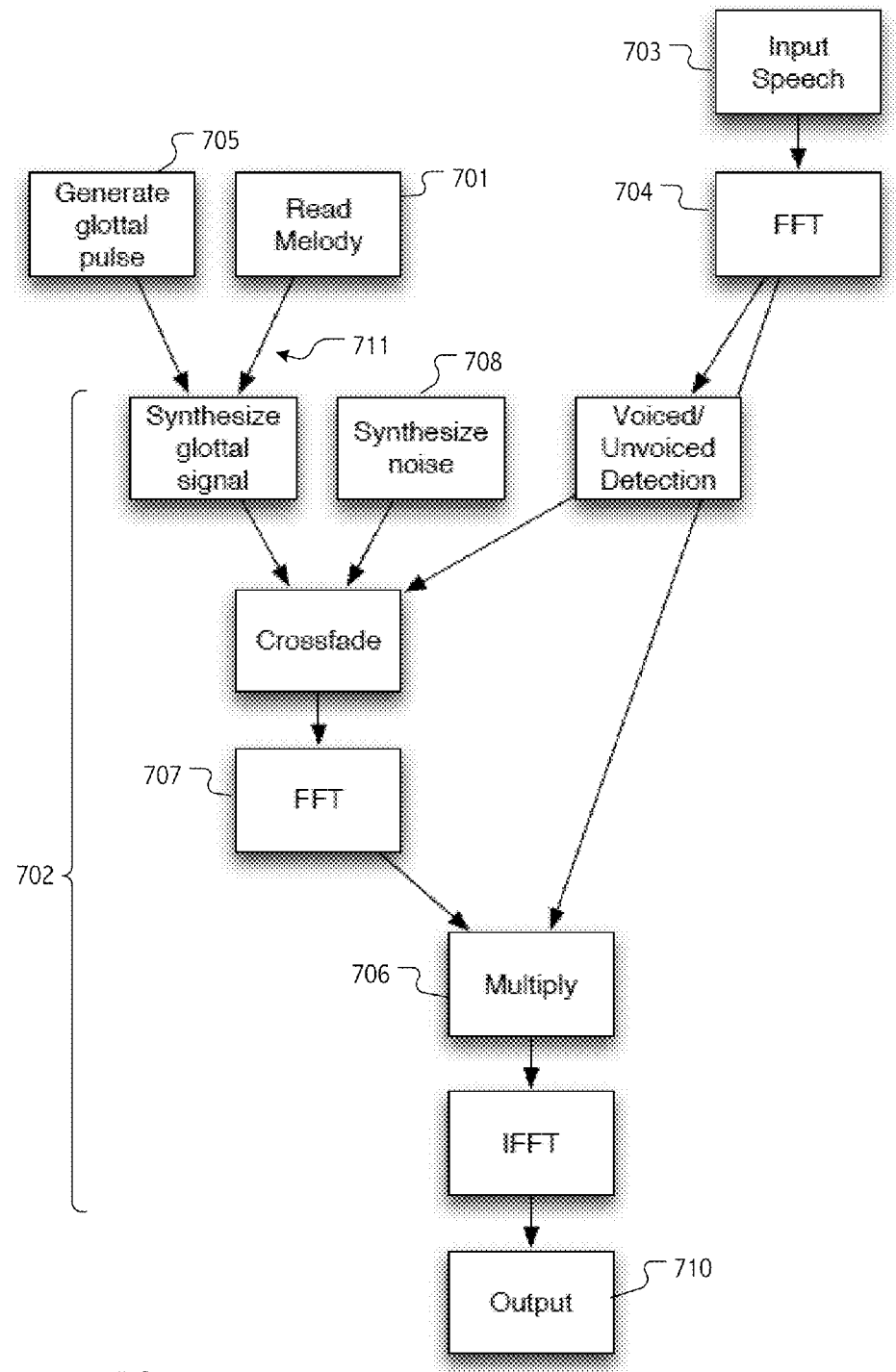
FIG. 7 graphically illustrates signal processing functional flows in a speech-to-song (songification) application in accordance with some embodiments of the present invention.

For some embodiments, a desirable attribute of an implemented speech-to-melody (S2M) transformation is that the speech should remain intelligible while sounding clearly like a musical melody. Although persons of ordinary skill in the art will appreciate a variety of possible techniques that may be employed, our approach is based on cross-synthesis of a glottal pulse, which emulates the periodic excitation of the voice, with the speaker's voice. This leads to a clearly pitched signal that retains the timbral characteristics of the voice, allowing the speech content to be clearly understood in a wide variety of situations. FIG. 7 shows a block diagram of signal processing flows in some embodiments in which a melody score 701 (e.g., that read from local storage, downloaded or demand-supplied for, or in connection with, a backing track, etc.) is used as an input to cross synthesis (702) of a glottal pulse. Source excitation of the cross synthesis is the glottal signal (from 707), while target spectrum is provided by FFT 704 of the input vocals.

Figure 8:
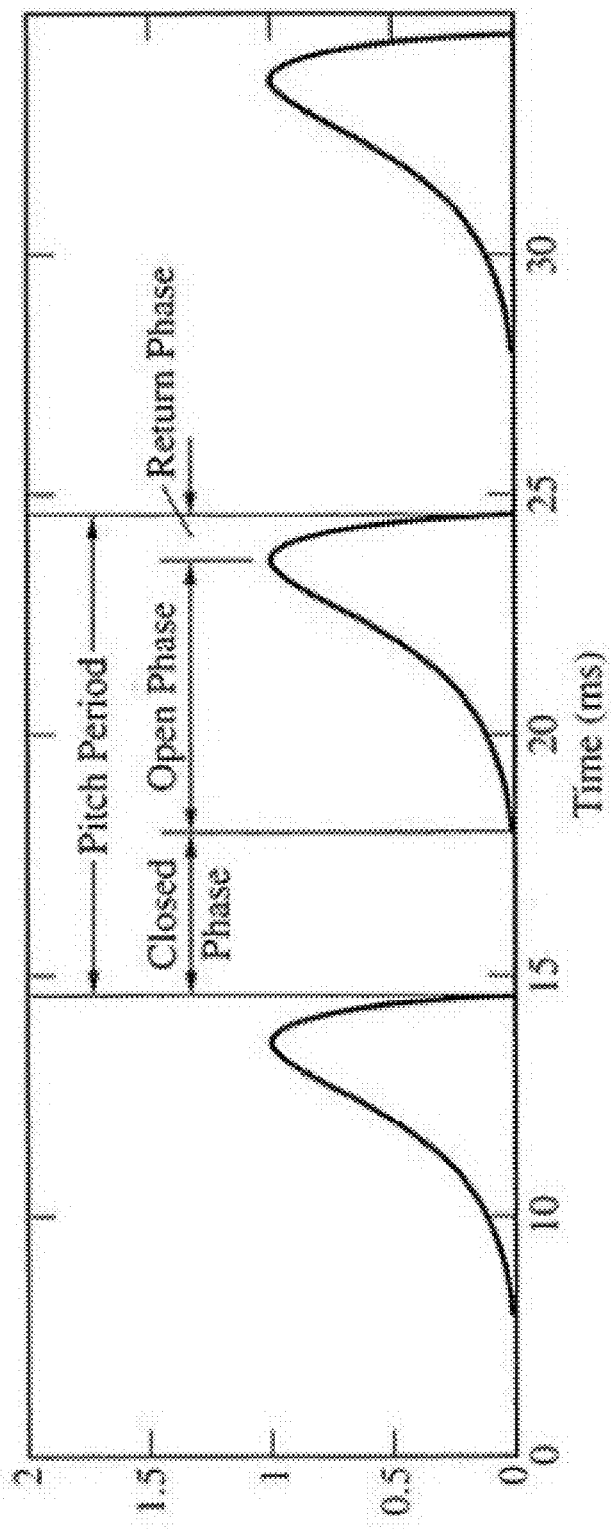
FIG. 8 graphically illustrates a glottal pulse model that may be employed in some embodiments in accordance with the present invention for synthesis of a pitch shifted version of an audio signal that has been aligned, stretched and/or compressed in correspondence with a rhythmic skeleton or grid.

The input speech 703 is sampled at 44.1 kHz and its spectrogram is calculated (704) using a 1024 sample Hann window (23 ms) overlapped by 75 samples. The glottal pulse (705) was based on the Rosenberg model which is shown in FIG. 8. It is created according to the following equation and consists of three regions that correspond to pre-onset ($0$–$t_0$), onset-to-peak ($t_0$–$t_f$), and peak-to-end ($t_f$–$T_p$). $T_p$ is the pitch period of the pulse. This is summarized by the following equation:

$$g(t) = \begin{cases} 0 \text{ for } 0 \leq t \leq t_0 \\ A_g \sin\left(\frac{\pi}{2} \frac{t - t_0}{t_f - t_0}\right) \\ A_g \sin\left(\frac{\pi}{2} \frac{t - t_f}{T_p - t_f}\right) \end{cases}$$

Parameters of the Rosenberg glottal pulse include the relative open duration ($(t_f-t_0)/T_p$) and the relative closed duration ($(T_p-t_f)/T_p$). By varying these ratios the timbral characteristics can be varied. In addition to this, the basic shape was modified to give the pulse a more natural quality. In particular, the mathematically defined shape was traced by hand (i.e. using a mouse with a paint program), leading to slight irregularities. The "dirtied waveform was then low-passed filtered using a 20-point finite impulse response (FIR) filter to remove sudden discontinuities introduced by the quantization of the mouse coordinates.

The pitch of the above glottal pulse is given by $T_p$. In our case, we wished to be able to flexibly use the same glottal pulse shape for different pitches, and to be able to control this continuously. This was accomplished by resampling the glottal pulse according to the desired pitch, thus changing the amount by which to hop in the waveform. Linear interpolation was used to determine the value of the glottal pulse at each hop.

The spectrogram of the glottal waveform was taken using a 1024 sample Hann window overlapped by 75%. The cross synthesis (702) between the periodic glottal pulse waveform and the speech was accomplished by multiplying (706) the magnitude spectrum (707) of each frame of the speech by the complex spectrum of the glottal pulse, effectively rescaling the magnitude of the complex amplitudes according to the glottal pulse spectrum. In some cases or embodiments, rather than using the magnitude spectrum directly, the energy in each bark band is used after pre-emphasizing (spectral whitening) the spectrum. In this way, the harmonic structure of the glottal pulse spectrum is undisturbed while the formant structure of the speech is imprinted upon it. We have found this to be an effective technique for the speech to music transform.

One issue that arises with the above approach is that un-voiced sounds such as some consonant phonemes, which are inherently noisy, are not modeled well by the above approach. This can lead to a "ringing sound" when they are present in the speech and to a loss of percussive quality. To better preserve these sections, we introduce a controlled amount of high passed white noise (708). Unvoiced sounds tend to have a broadband spectrum, and spectral roll-off is again used as an indicative audio feature. Specifically, frames that are not characterized by significant roll-off of high frequency content are candidates for a somewhat compensatory addition of high passed white noise. The amount of noise introduced is controlled by the spectral roll-off of the frame, such that unvoiced sounds that have a broadband spectrum, but which are otherwise not well modeled using the glottal pulse techniques described above, are mixed with an amount of high passed white noise that is controlled by this indicative audio feature. We have found that this leads to output which is much more intelligible and natural.

Song Construction, Generally

Some implementations of the speech to music songification process described above employ a pitch control signal which determines the pitch of the glottal pulse. As will be appreciated, the control signal can be generated in any number of ways. For example, it might be generated randomly, or according to statistical model. In some cases or embodiments, a pitch control signal (e.g., 711) is based on a melody (701) that has been composed using symbolic notation, or sung. In the former case, a symbolic notation, such as MIDI is processed using a Python script to generate an audio rate control signal consisting of a vector of target pitch values. In the case of a sung melody, a pitch detection algorithm can be used to generate the control signal. Depending on the granularity of the pitch estimate, linear interpolation is used to generate the audio rate control signal.

A further step in creating a song is mixing the aligned and synthesis transformed speech (output 710) with a backing track, which is in the form of a digital audio file. It should be noted that as described above, it is not known in advance how long the final melody will be. The rhythmic alignment step may choose a short or long pattern. To account for this, the backing track is typically composed so that it can be seamlessly looped to accommodate longer patterns. If the final melody is shorter than the loop, then no action is taken and there will be a portion of song with no vocals.

Variations for Output Consistent with Other Genres

Referring again to FIG. 2B, a variation was described that adds speech to rap transformations (AutoRap functionality 222) into audio pipeline 220. Implementations of AutoRap functionality 222 and transformations performed thereby are now more completely described. As before, AutoRap functionality 222 will be understood generally as additional signal processing performed on captured audio to prepare derived audio that has, or conforms to, certain musical structural characteristics or templates, be they phrase structure, meter, tonal values, etc. Persons of ordinary skill having benefit of the present disclosure will appreciate some commonality of signal processing techniques with those described above relative to Songify-type speech to song transformations.

Accordingly, we now describe further methods that are more suitable for transforming speech into "rap", that is, speech that has been rhythmically aligned to a beat. We call this process "AutoRap" and persons of ordinary skill in the art will appreciate a broad range of implementations based on the description herein. In particular, aspects of a larger computational flow (e.g., as summarized in FIG. 4 through functional or computational blocks such as previously illustrated and described relative to an application executing on a computing platform, recall FIG. 3) remain applicable. However, certain adaptations to previously described, segmentation and alignment techniques are appropriate for speech-to-rap embodiments. The illustration of FIG. 9 pertains to certain illustrative speech-to-rap embodiments.

As before, segmentation (here segmentation 911) employing a detection function is calculated using the spectral difference function based on a bark band representation. However, here we emphasize a sub-band from approximately 700 Hz to 1500 Hz, when computing the detection function. It was found that a band-limited or emphasized DF more closely corresponds to the syllable nuclei, which perceptually are points of stress in the speech.

More specifically, it has been found that while a mid-band limitation provides good detection performance, even better detection performance can be achieved in some cases by weighting the mid-bands but still considering spectrum outside the emphasized mid-band. This is because percussive onsets, which are characterized by broadband features, are captured in addition to vowel onsets, which are primarily detected using mid-bands. In some embodiments, a desirable weighting is based on taking the log of the power in each bark band and multiplying by 10, for the mid-bands, while not applying the log or rescaling to other bands.

When the spectral difference is computed, this approach tends to give greater weight to the mid-bands since the range of values is greater. However, because the L-norm is used with a value of 0.25 when computing the distance in the spectral distance function, small changes that occur across many bands will also register as a large change, such as if a difference of a greater magnitude had been observed in one, or a few, bands. If a Euclidean distance had been used, this effect would not have been observed. Of course, other mid-band emphasis techniques may be utilized in other embodiments.

Aside from the mid-band emphasis just described, detection function computation is analogous to the spectral difference (SDF) techniques described above for speech-to-song implementations (recall FIGS. 5 and 6, and accompanying description). As before, local peak picking is performed on the SDF using a scaled median threshold. The scale factor controls how much the peak has to exceed the local median to be considered a peak. After peak peaking, the SDF is passed, as before, to the agglomeration function. Turning again to FIG. 9, but again as noted above, agglomeration halts when no segment is less than the minimum segment length, leaving the original vocal utterance divided into contiguous segments (here 904).

Next, a rhythmic pattern (e.g., rhythmic skeleton or grid 903) is defined, generated or retrieved. Note that in some embodiments, a user may select and reselect from a library of rhythmic skeletons for differing target raps, performances, artists, styles etc. As with phrase templates, rhythmic skeletons or grids may be transacted, made available or demand supplied (or computed) in accordance with a part of an in-app-purchase revenue model or may be earned, published or exchanged as part of a gaming, teaching and/or social-type user interaction supported.

In some embodiments, a rhythmic pattern is represented as a series of impulses at particular time locations. For example, this might simply be an equally spaced grid of impulses, where the inter-pulse width is related to the tempo of the current song. If the song has a tempo of 120 BPM, and thus an inter-beat period of 0.5 s, then the inter-pulse would typically be an integer fraction of this (e.g. 0.5, 0.25, etc.). In musical terms, this is equivalent to an impulse every quarter note, or every eighth note, etc. More complex patterns can also be defined. For example, we might specify a repeating pattern of two quarter notes followed by four eighth notes, making a four beat pattern. At a tempo of 120 BPM the pulses would be at the following time locations (in seconds): 0, 0.5. 1.5, 1.75, 2.0, 2.25, 3.0, 3.5, 4.0, 4.25, 4.5, 4.75.

Figure 9:
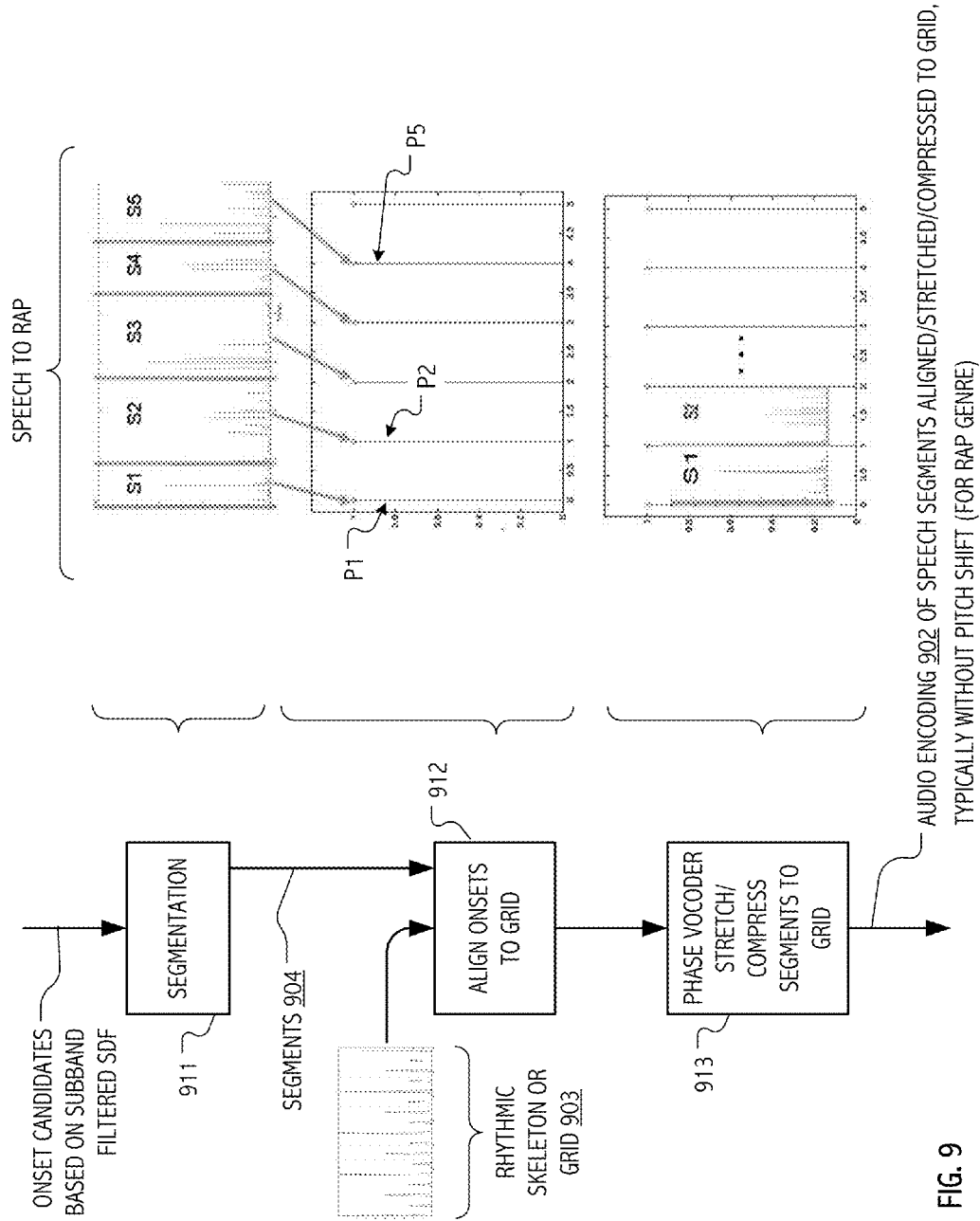
FIG. 9 illustrates, by way of a flowchart and a graphical illustration of segmentation and alignment, a sequence of steps in an illustrative method whereby onsets are aligned to a rhythmic skeleton or grid and corresponding segments of a segmented audio signal are stretched and/or compressed in accordance with some speech-to-rap targeted embodiments of the present invention(s).

After segmentation (911) and grid construction, alignment is (912) performed. FIG. 9 illustrates an alignment process that differs from the phrase template driven technique of FIG. 6, and which is instead adapted for speech-to-rap embodiments. Referring to FIG. 9, each segment is moved in sequential order to the corresponding rhythmic pulse. If we have segments S1, S2, S3 . . . S5 and pulses P1, P2, P3 . . . S5, then segment S1 is moved to the location of pulse P1, S2 to P2, and so on. In general, the length of the segment will not match the distance between consecutive pulses. There are two procedures that we use to deal with this:

The segment is time stretched (if it is too short), or compressed (if it is too long) to fit the space between consecutive pulses. The process is illustrated graphically in FIG. 9. We describe below a technique for time-stretching and compressing which is based on use of a phase vocoder 913.

If the segment is too short, it is padded with silence. The first procedure is used most often, but if the segment requires substantial stretching to fit, the latter procedure is sometimes used to prevent stretching artifacts.

Two additional strategies are employed to minimize excessive stretching or compression. First, rather than only starting the mapping from S1, we consider all mapping starting from every possible segment and wrapping around when the end is reached. Thus, if we start at S5 the mapping will be segment S5 to pulse P1, S6 to P2 etc. For each starting point, we measure the total amount of stretching/compression, which we call rhythmic distortion. In some embodiments, a rhythmic distortion score is computed as the reciprocal of stretch ratios less than one. This procedure is repeated for each rhythmic pattern. The rhythmic pattern (e.g., rhythmic skeleton or grid 903) and starting point which minimize the rhythmic distortion score are taken to be the best mapping and used for synthesis.

In some cases or embodiments, an alternate rhythmic distortion score, that we found often worked better, was computed by counting the number of outliers in the distribution of the speed scores. Specifically, the data were divided into deciles and the number of segments whose speed scores were in the bottom and top deciles were added to give the score. A higher score indicates more outliers and thus a greater degree of rhythmic distortion.

Second, phase vocoder 913 is used for stretching/compression at a variable rate. This is done in real-time, that is, without access to the entire source audio. Time stretch and compression necessarily result in input and output of different lengths—this is used to control the degree of stretching/compression. In some cases or embodiments, phase vocoder 913 operates with four times overlap, adding its output to an accumulating FIFO buffer. As output is requested, data is copied from this buffer. When the end of the valid portion of this buffer is reached, the core routine generates the next hop of data at the current time step. For each hop, new input data is retrieved by a callback, provided during initialization, which allows an external object to control the amount of time-stretching/compression by providing a certain number of audio samples. To calculate the output for one time step, two overlapping windows of length 1024 (nfft), offset by nfft/4, are compared, along with the complex output from the previous time step. To allow for this in a real-time context where the full input signal may not be available, phase vocoder 913 maintains a FIFO buffer of the input signal, of length 5/4 nfft; thus these two overlapping windows are available at any time step. The window with the most recent data is referred to as the "front" window; the other ("back") window is used to get delta phase.

First, the previous complex output is normalized by its magnitude, to get a vector of unit-magnitude complex numbers, representing the phase component. Then the FFT is taken of both front and back windows. The normalized previous output is multiplied by the complex conjugate of the back window, resulting in a complex vector with the magnitude of the back window, and phase equal to the difference between the back window and the previous output.

We attempt to preserve phase coherence between adjacent frequency bins by replacing each complex amplitude of a given frequency bin with the average over its immediate neighbors. If a clear sinusoid is present in one bin, with low-level noise in adjacent bins, then its magnitude will be greater than its neighbors and their phases will be replaced by that of the true sinusoid. We find that this significantly improves resynthesis quality.

The resulting vector is then normalized by its magnitude; a tiny offset is added before normalization to ensure that even zero-magnitude bins will normalize to unit magnitude. This vector is multiplied with the Fourier transform of the front window; the resulting vector has the magnitude of the front window, but the phase will be the phase of the previous output plus the difference between the front and back windows. If output is requested at the same rate that input is provided by the callback, then this would be equivalent to reconstruction if the phase coherence step were excluded.

Auto-Generated Accompaniment Variations

Referring back to FIG. 2C, a variation was described that incorporates auto accompaniment transformations (LaDiDa functionality 223) into audio pipeline 220. Implementations of LaDiDa functionality 223 and transformations performed thereby are now more completely described. As before, LaDiDa functionality 223 will be understood generally as additional signal processing performed on captured vocals (audio) to track vocal pitch and estimate key, analyze melody structure and identify boundaries and sections. Based on such derived characteristics, LaDiDa functionality 223 automatically generates musical accompaniment for the captured vocals. Segmentation and phrase template mapping techniques detailed above with respect to Songify and AutoRap-type transformation may optionally be included and will be understood by persons of ordinary skill in the art having benefit of the present disclosure.

In variations in accord with FIG. 2C, captured audio includes vocals. Computationally automated generation of musical accompaniment from captured vocals is provided in addition to the basic functionality (recall FIG. 2A) of coordinated audio and video effects filter pairings 261 applied in audio (220) and video (230) pipelines. As illustrated in the top-level functional flow of FIG. 11, LaDiDa-type functionality 223 provides additional signal processing for captured vocal audio 1191 to track vocal pitch (1192) and estimate key (1193), analyze melody structure (1194) and thereby identify boundaries and sections in the vocals. Based on such derived characteristics, LaDiDa-type functionality 223 automatically generates musical accompaniment using hidden Markov model (HMM) techniques for chord assignment (1195) and using selections (1196) from template style files. It will be appreciated that the resulting MIDI-format accompaniment (1197) may be mixed in audio pipe 220 with captured vocals (including processed derivatives of the captured vocals) to produce the vocal signal/data eventually rendered in rendering engine 250 (recall FIG. 2C).

Audio filter 221 operations may, in general, be applied to signals/encodings of the captured vocals, of autogenerated accompaniment, or to the mixed performance (captured/processed vocals mixed with autogenerated accompaniment). Optionally, audio features extracted by LaDiDa-type functionality 223 (e.g., structure boundaries) and/or selections (e.g., style) computationally derived therefrom may be propagated to the video pipeline 230 side video filter 231 so as to coordinate application of video performance effects with audio content (vocals with autogenerated accompaniment) processed in audio pipeline 220.

Figure 11:
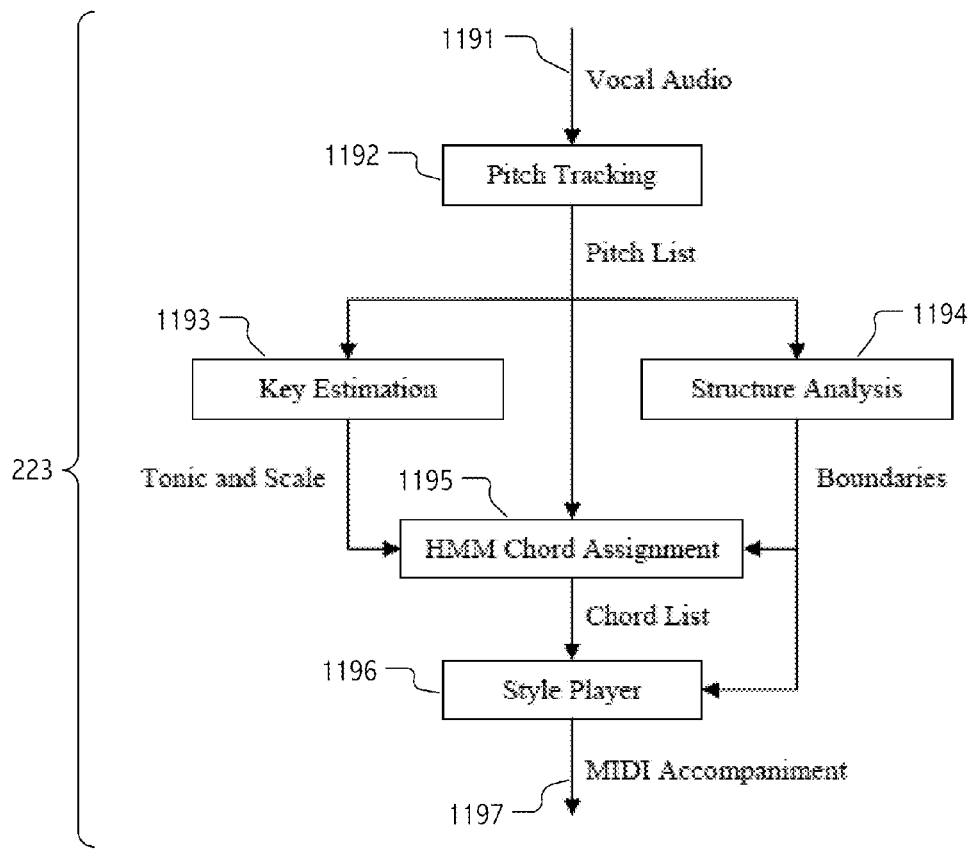
FIG. 11 is a flowchart that illustrates a process by which musical accompaniment may be automatically and computationally generated from captured vocals in accordance with some embodiments of the present invention(s).

While persons of skill in the art having benefit of the present disclosure will appreciate a variety of possible implementations for automated generation of musical accompaniment in accord with FIG. 11 or based on a subset or superset of the techniques applied therein, further detail for exemplary and concrete computational system implementations of vocal pitch tracking (1192), key estimation (1193), structural analysis (1194), hidden Markov model (HMM) techniques for chord assignment (1195) and style player selections (1196) appear in Appendix A of U.S. Provisional Application No. 61/736,503, filed Dec. 12, 2012, which is incorporated herein by reference.

System and Networked Deployments

Figure 10:
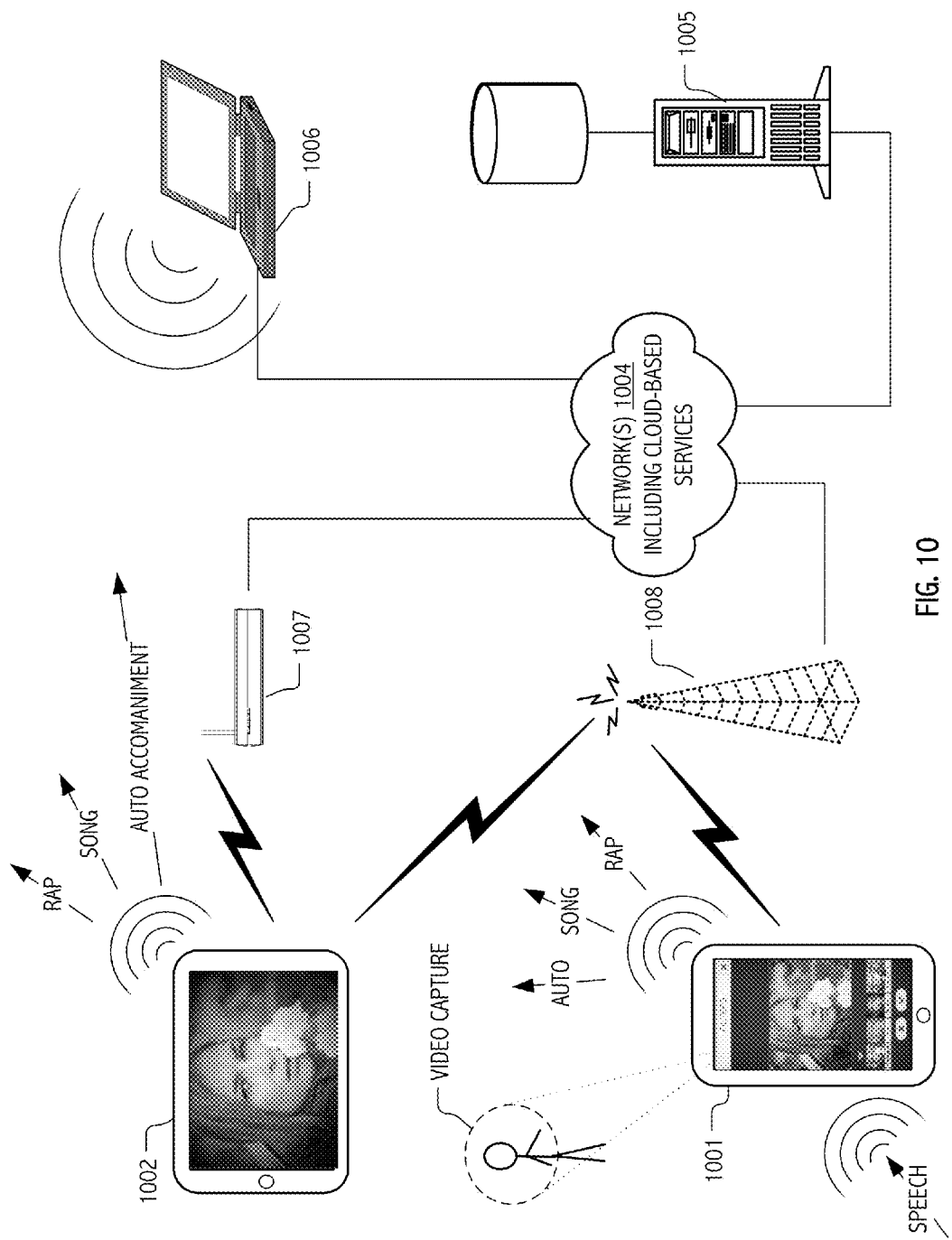
FIG. 10 illustrates a networked communication environment in which speech-to-music and/or speech-to-rap targeted implementations communicate with remote data stores or service platforms and/or with remote devices suitable for audible rendering of audio signals transformed in accordance with some embodiments of the present invention(s).

FIG. 10 illustrates a networked communication environment in which audiovisual capture and sharing is provided with coordinated, user selectable audio and video effects filters, including in some embodiments speech-to-music or speech-to-rap targeted and/or auto accompaniment generating computational facilities. Computational facilities are implemented as applications (or otherwise callable/executable functionality) embodying computational realizations of signal processing techniques described herein and executable on a handheld computing platform 1001) to capture audiovisual content (e.g., via a microphone and camera interfaces or inputs) and are in communication with remote data stores or service platforms (e.g., server/service 1005 or within a network cloud 1004) and/or with remote devices (e.g., handheld computing platform 1002 hosting an additional audiovisual capture and/or sharing application instance and/or computer 1006), suitable for audible and visual rendering of audio signals transformed in accordance with some embodiments of the present invention(s).

Other Embodiments

While the invention(s) is (are) described with reference to various embodiments, it will be understood that these embodiments are illustrative and that the scope of the invention(s) is not limited to them. Many variations, modifications, additions, and improvements are possible. For example, while embodiments have been described in which vocal speech is captured and automatically transformed and aligned for mix with a backing track, it will be appreciated that automated transforms of captured vocals described herein may also be employed to provide expressive performances that are temporally aligned with a target rhythm or meter (such as may be characteristic of a poem, iambic cycle, limerick, etc.) and without musical accompaniment.

Furthermore, while certain illustrative signal processing techniques have been described in the context of certain illustrative applications, persons of ordinary skill in the art will recognize that it is straightforward to modify the described techniques to accommodate other suitable signal processing techniques and effects.

Some embodiments in accordance with the present invention(s) may take the form of, and/or be provided as, purpose-built devices such as for the toy or amusement markets. Figures herein functional blocks together with data and other flows suitable for such device types in which automated transformation techniques described herein (relative to programmable handheld computing platform, e.g., iOS device, embodiments) may be provided at low-cost in a purpose-built device having a microphone for vocal capture, a programmed microcontroller, digital-to-analog circuits (DAC), analog-to-digital converter (ADC) circuits and an optional integrated speaker or audio signal output.

Some embodiments in accordance with the present invention(s) may take the form of, and/or be provided as, a computer program product encoded in a machine-readable medium as instruction sequences and other functional constructs of software tangibly embodied in non-transient media, which may in turn be executed in a computational system (such as a iPhone handheld, mobile device or portable computing device) to perform methods described herein. In general, a machine readable medium can include tangible articles that encode information in a form (e.g., as applications, source or object code, functionally descriptive information, etc.) readable by a machine (e.g., a computer, computational facilities of a mobile device or portable computing device, etc.) as well as tangible, non-transient storage incident to transmission of the information. A machine-readable medium may include, but is not limited to, magnetic storage medium (e.g., disks and/or tape storage); optical storage medium (e.g., CD-ROM, DVD, etc.); magneto-optical storage medium; read only memory (ROM); random access memory (RAM); erasable programmable memory (e.g., EPROM and EEPROM); flash memory; or other types of medium suitable for storing electronic instructions, operation sequences, functionally descriptive information encodings, etc.

In general, plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. An audiovisual processing method comprising:
using a portable computing device to capture corresponding audio and video streams from microphone and camera interfaces thereof and to store, at least temporarily, the captured audio and video streams in storage;
on the portable computing device, selecting a first effect profile from a plurality of predefined effect profiles, the predefined effect profiles selective for respective and coordinated pairings of audio and visual filters to be applied to the audio and video streams, respectively;
processing the audio and video streams in respective and coordinated audio and video pipelines, wherein the coordination is based at least in part on application of the coordinated audio and visual filters to the respective audio and video streams, wherein the processing the audio and video streams includes:
in the audio pipeline, segmenting the audio stream into plural segments and mapping individual ones of the segments to respective subphrase portions of a phrase template for a target song; and
in the video pipeline, segmenting the video stream and mapping segments thereof in correspondence with the audio segmentation and mapping;
audiovisually rendering the audio and video streams, with the coordinated audio and visual filters applied, to a display of the portable computing device; and thereafter
storing, transmitting or posting the rendered audiovisual content.

2. The method of claim 1, further comprising:
prior to the storing, transmitting or posting, selecting at least a second effect profile from the plurality of predefined effect profiles and performing the processing and audiovisual rendering steps using the coordinated audio and visual filters of the second effect profile.

3. The method of claim 1,
wherein at least the first effect profile is selective for an audio filter that, when applied in the audio pipeline, extracts temporally localizable features from the processed audio stream, and
wherein the coordination further includes using, in the video pipeline, at least one temporally localizable feature extracted in the audio pipeline.

4. The method of claim 1,
wherein at least the first effect profile is selective for a video filter that, when applied in the video pipeline, extracts temporally localizable features from the processed video stream, and
wherein the coordination further includes using, in the audio pipeline, at least one temporally localizable feature extracted in the video pipeline.

5. The method of claim 1,
wherein the captured audio stream includes vocals temporally synchronized with the video stream, and
wherein the segments are delimited in the audio pipeline based on onsets detected in the vocals.

6. The method of claim 1, further comprising:
in the audio pipeline, segmenting the audio stream into plural segments, temporally aligning successive ones of the segments with respective pulses of a rhythmic skeleton for a target song, temporally stretching at least some of the temporally aligned segments and temporally compressing at least some other ones of the temporally aligned segments,
wherein the coordination further includes, in the video pipeline, segmenting the video stream and temporally aligning, stretching and compressing respective segments thereof in correspondence with the audio segmentation aligning, stretching and compressing.

7. The method of claim 6,
wherein the captured audio stream includes vocals temporally synchronized with the video stream, and
wherein the segments are delimited in the audio pipeline based on onsets detected in the vocals.

8. The method of claim 1, wherein the captured audio stream includes vocals and further comprising:
automatically generating, in the audio pipeline, a musical accompaniment for the vocals based on a selection of chords that are harmonies of melody pitches detected in the vocals and further based on a statistical model of chord progressions.

9. The method of claim 1, further comprising:
transacting from the portable computing device a purchase or license of one or more additional effects profiles.

10. The method of claim 9, further comprising:
in furtherance of the transacting, retrieving via a communications interface of the portable computing device, or unlocking a preexisting stored instance of, a computer readable encoding of the one or more additional effects profiles.

11. The method of claim 1,
wherein the storage is local to the portable computing device.

12. The method of claim 1,
wherein the storage is at least partially network resident and remote from the portable computing device.

13. The method of claim 1, further comprising:
performing the processing in accord with at least a finally selected effect profile at a service platform that is in network communication with, but physically remote from, the portable computing device.

14. The method of claim 1, wherein an audio filter instance, when applied to the audio stream in the audio pipeline, provides one or more of:
spectral equalization,
audio compression,
pitch correction,
stereo delay,
reverberation or echo and
mix with an audio track.

15. The method of claim 1, wherein a video filter instance, when applied to the video stream in the video pipeline, provides one or more of:
blurring or sharpening,
color map selection or transformation;
chromatic distortion or equalization,
visual noise, overlays or picture framing,
brightness or contrast changes; and
video frame rate changes or gating.

16. The method of claim 1, wherein the portable computing device is selected from the group of:
a computing pad;
a game controller;
a personal digital assistant or book reader; and
a mobile phone or media player.

17. The method of claim 1,
wherein the coordinated pairings of audio and visual filters specify artistically consistent effects to be applied to the audio and video streams.

18. The method of claim 1,
wherein at least one of the coordinated pairings of audio and visual filters specifies a vintage effect that, in the audio pipeline, includes a band-limiting filter and audio mix with a scratch and pop track and, in the video pipeline, includes a sepia tone filter and a video overlay with film grain and scratches.

19. A computer program product encoded in a non-transitory computer-readable medium, the computer program product including instructions executable on a processor of a portable computing device to cause the portable computing device to perform steps including:
capturing corresponding audio and video streams from microphone and camera interfaces thereof and to store, at least temporarily, the captured audio and video streams in storage;
selecting a first effect profile from a plurality of predefined effect profiles, the predefined effect profiles selective for respective and coordinated pairings of audio and visual filters to be applied to the audio and video streams, respectively;
processing the audio and video streams in respective and coordinated audio and video pipelines, wherein the coordination is based at least in part on application of the coordinated audio and visual filters to the respective audio and video streams, wherein the processing includes:
in the audio pipeline, segmenting the audio stream into plural segments and mapping individual ones of the segments to respective subphrase portions of a phrase template for a target song; and
in the video pipeline, segmenting the video stream and mapping segments thereof in correspondence with the audio segmentation and mapping;
audiovisually rendering the audio and video streams, with the coordinated audio and visual filters applied, to a display of the portable computing device; and thereafter
storing, transmitting or posting the rendered audiovisual content.

20. A system comprising a portable computing device programmed with instructions executable on a processor thereof to cause the portable computing device to perform steps including:
capturing corresponding audio and video streams from microphone and camera interfaces thereof and to store, at least temporarily, the captured audio and video streams in storage;
selecting a first effect profile from a plurality of predefined effect profiles, the predefined effect profiles selective for respective and coordinated pairings of audio and visual filters to be applied to the audio and video streams, respectively;
processing the audio and video streams in respective and coordinated audio and video pipelines, wherein the coordination is based at least in part on application of the coordinated audio and visual filters to the respective audio and video streams, wherein the processing includes:
in the audio pipeline, segmenting the audio stream into plural segments and mapping individual ones of the segments to respective subphrase portions of a phrase template for a target song; and
in the video pipeline, segmenting the video stream and mapping segments thereof in correspondence with the audio segmentation and mapping;
audiovisually rendering the audio and video streams, with the coordinated audio and visual filters applied, to a display of the portable computing device; and thereafter
storing, transmitting or posting the rendered audiovisual content.

21. A computational method for transforming audiovisual content, the method comprising:
- accessing the encoding of audiovisual content from computer readable storage, wherein the audiovisual content includes coordinated audio and video streams; and
- processing the audio and video streams in respective and coordinated audio and video pipelines, wherein coordination of the respective audio and video pipelines includes:
  - using, in the processing by the video pipeline, temporally localizable features extracted in the audio pipeline, wherein at least some of the temporally localizable features delimit audio-side epochs, and
  - reordering respective portions of both the audio and video streams in accordance with the epochs.

22. The method of claim 21, further comprising:
- mapping audio of particular epochs to respective portions of a song template, wherein the mapping includes one or more of temporally stretching and compressing the audio, and
- wherein the coordination includes mapping the corresponding portions of the video stream in accord with the epoch mappings and applying a corresponding temporal stretch and compression to the video stream.

23. The method of claim 22,
- wherein the mapping includes repeating respective portions of the audio stream, and
- wherein the coordinating includes applying a same repeat to the video stream.

24. The method of claim 21,
- wherein the audio stream includes vocals and at least some of the temporally localizable features correspond to onsets detected in the vocals.

25. The method of claim 21, further comprising:
- segmenting, in the audio pipeline, an audio encoding of vocals into plural segments and mapping individual ones of the segments to respective subphrase portions of a phrase template for a target song,
- wherein the coordination includes, in the video pipeline, segmenting the video stream and mapping segments thereof in correspondence with the audio segmentation and mapping.

26. The method of claim 25,
- wherein the segments correspond to sequences of samples of the audio encoding delimited by onsets identified in the audio encoding.

27. The method of claim 25, further comprising:
- in the audio pipeline, temporally aligning one or more of the mapped audio segments with a rhythmic skeleton for the target song; and
- in the video pipeline, temporally aligning the video segments in correspondence with the audio alignment.

28. The method of claim 21, further comprising:
- in the audio pipeline, segmenting an audio encoding of vocals into plural segments, temporally aligning successive ones of the segments with respective pulses of a rhythmic skeleton for a target song, temporally stretching at least some of the temporally aligned segments and temporally compressing at least some other ones of the temporally aligned segments,
- wherein the coordination includes, in the video pipeline, segmenting the video stream and temporally aligning, stretching and compressing respective segments thereof in correspondence with the audio segmentation aligning, stretching and compressing.

29. The method of claim 21, wherein the captured audio stream includes vocals and further comprises:
- automatically generating, in the audio pipeline, a musical accompaniment for the vocals based on a selection of chords that are harmonies of melody pitches detected in the vocals and further based on a statistical model of chord progressions.

30. The method of claim 21, further comprising:
- on a portable computing device, capturing the coordinated audio and video streams and performing the audio and video stream processing in the respective and coordinated audio and video pipelines.

31. The method of claim 30, further comprising:
- on the portable computing device, audiovisually rendering an output of the coordinated audio and video pipelines.

32. The method of claim 21,
- wherein the computer readable storage is local to a portable computing device that hosts the audio and video pipelines.

33. The method of claim 21,
- wherein the computer readable storage is at least partially network resident and remote from a portable computing device that hosts the audio and video pipelines.

34. The method of claim 21,
- wherein the coordination of the respective audio and video pipelines further includes applying artistically consistent effects to the audio and video streams, and
- further comprising audiovisually rendering the audio and video streams with the artistically consistent effects applied.

35. The method of claim 34,
- wherein the artistically consistent effects include a vintage effect,
- wherein the vintage effect applied in the audio pipeline includes a band-limiting filter and audio mix with a scratch and pop track; and
- wherein the vintage effect applied in the video pipeline includes a sepia tone filter and a video overlay with film grain and scratches.

36. A computational method for transforming audiovisual content, the method comprising:
- accessing the encoding of audiovisual content from computer readable storage, wherein the audiovisual content includes coordinated audio and video streams; and
- processing the audio and video streams in respective and coordinated audio and video pipelines, wherein coordination of the respective audio and video pipelines includes using, in the processing by the audio pipeline, temporally localizable features extracted in the video pipeline;
- in the audio pipeline, segmenting the audio stream into plural segments, temporally aligning successive ones of the segments with respective pulses of a rhythmic skeleton for a target song, temporally stretching at least some of the temporally aligned segments, and temporally compressing at least some other ones of the temporally aligned segments,
- in the video pipeline, segmenting the video stream and temporally aligning, stretching and compressing respective segments thereof in correspondence with the audio segmentation aligning, stretching and compressing.

37. The method of claim 36,
- wherein at least some of the temporally localizable features delimit video epochs; and
- wherein the use of temporally localizable features includes segmenting the audio stream based at least in part on boundaries between the video epochs.

38. The method of claim 36, wherein the temporally localizable features include one or more of:
  a rapid change in magnitude or direction of optical flow;
  a rapid change in chromatic distribution; and
  a rapid change in overall or spatial distribution of brightness.

39. A method comprising:
  capturing coordinated audio and video streams at a portable computing device, wherein the captured audio stream includes vocals;
  processing the audio and video streams in respective and coordinated audio and video pipelines, wherein coordination of the respective audio and video pipelines includes either or both of (i) using one or more features extracted in the audio pipeline in the processing by the video pipeline and (ii) using one or more features extracted in the video pipeline in the processing by the audio pipeline;
  automatically generating, in the audio pipeline, a musical accompaniment for the vocals based on a selection of chords that are harmonies of melody pitches detected in the vocals and further based on a statistical model of chord progressions; and
  on the portable computing device, audiovisually rendering output of the coordinated audio and video pipelines.

40. The method of claim 39, wherein the portable computing device is selected from the group of:
  a computing pad;
  a game controller;
  a personal digital assistant or book reader; and
  a mobile phone or media player.

41. A computer program product encoded in a non-transitory computer-readable medium, the computer program product including instructions executable on a processor of a portable computing device to cause the portable computing device to perform the steps including:
  capturing coordinated audio and video streams, wherein the captured audio stream includes vocals;
  processing the audio and video streams in respective and coordinated audio and video pipelines, wherein coordination of the respective audio and video pipelines includes either or both of (i) using one or more features extracted in the audio pipeline in the processing by the video pipeline and (ii) using one or more features extracted in the video pipeline in the processing by the audio pipeline;
  automatically generating, in the audio pipeline, a musical accompaniment for the vocals based on a selection of chords that are harmonies of melody pitches detected in the vocals and further based on a statistical model of chord progressions; and
  audiovisually rendering output of the coordinated audio and video pipelines.

42. A method comprising:
  capturing coordinated audio and video streams using a portable computing device, the captured audio stream including vocals;
  selecting from amongst predefined pairs of coordinated audio and visual effects to be applied in audio and video pipelines of the portable computing device,
  automatically generating musical accompaniment for the vocals based on a selection of chords that are harmonies of melody pitches detected in the vocals and further based on a statistical model of chord progressions; and
  audiovisually rendering the audio and video streams with the coordinated audio and visual effects applied.

43. The method of 42,
  wherein the audiovisual rendering includes the automatically generated musical accompaniment.

44. The method of claim 42, further comprising:
  selecting at least a second predefined pair of coordinated audio and visual effects and thereafter audiovisually re-rendering the audio and video streams with the second pair of coordinated audio and visual effects applied.

45. The method of claim 42, further comprising:
  storing, transmitting or posting the rendered or re-rendered audiovisual content.

46. The method of 42, wherein the audio effects include one or more of:
  a reverb or echo effect;
  a chorus or harmonize effect;
  a band-limited filter evocative of telephone, citizens' band (CB) radio or vintage audio; and
  an overlay track.

47. The method of 42, wherein the video effects include one or more of:
  a chromatic shift;
  a brightness or contrast change;
  a sharpening or blurring; and
  a video gating or overlay.

48. The method of claim 42, wherein the portable computing device is selected from the group of:
  a computing pad;
  a game controller;
  a personal digital assistant or book reader; and
  a mobile phone or media player.

* * * * *